US011600026B2

(12) United States Patent
Martin et al.

(10) Patent No.: US 11,600,026 B2
(45) Date of Patent: Mar. 7, 2023

(54) DATA PROCESSING SYSTEMS

(71) Applicant: Arm Limited, Cambridge (GB)

(72) Inventors: Samuel Martin, Waterbeach (GB);
Jakob Axel Fries, Malmo (SE); Ozgur Ozkurt, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/739,631

(22) Filed: Jan. 10, 2020

(65) Prior Publication Data
US 2020/0258264 A1    Aug. 13, 2020

(30) Foreign Application Priority Data
Feb. 12, 2019 (GB) ..................... 1901900

(51) Int. Cl.
*G06T 9/40* (2006.01)
*G09G 5/36* (2006.01)

(52) U.S. Cl.
CPC ............ *G06T 9/40* (2013.01); *G09G 5/363* (2013.01); *G09G 2340/02* (2013.01); *G09G 2340/0407* (2013.01)

(58) Field of Classification Search
CPC .............. G09G 5/363; G09G 2340/02; G09G 2340/0407; G06T 9/40
See application file for complete search history.

(56) References Cited

U.S. PATENT DOCUMENTS

| | | | | |
|---|---|---|---|---|
| 5,255,090 A | * | 10/1993 | Israelsen | G06T 9/008 341/67 |
| 5,321,776 A | * | 6/1994 | Shapiro | H04N 19/647 358/1.9 |
| 5,446,495 A | * | 8/1995 | Tourtier | H04N 19/61 375/E7.03 |
| 5,488,687 A | * | 1/1996 | Rich | G09G 5/397 345/545 |

(Continued)

FOREIGN PATENT DOCUMENTS

| | | |
|---|---|---|
| GB | 2553744 | 3/2018 |
| GB | 2573543 | 11/2019 |

(Continued)

OTHER PUBLICATIONS

GB Search Report dated Aug. 2, 2019, GB Patent Application No. GB1901900.9.

(Continued)

*Primary Examiner* — Charles L Beard
(74) *Attorney, Agent, or Firm* — Vierra Magen Marcus LLP

(57) ABSTRACT

A data processing system comprises encoding circuitry operable to encode arrays of data elements, decoding circuitry operable to decode encoded versions of arrays of data elements, and consumer circuitry operable to use arrays of data elements. Data indicative of a resolution that is to be used by the consumer circuitry for at least one region of the array of data elements is provided to the encoding circuitry, and the encoding circuitry uses the data indicative of the (Continued)

resolution that is to be used by the consumer circuitry to control the generation of the representation for representing at least one block that the array of data elements is divided into.

25 Claims, 7 Drawing Sheets

(56) References Cited

U.S. PATENT DOCUMENTS

| | | | | |
|---|---|---|---|---|
| 6,100,897 | A * | 8/2000 | Mayer | G06T 17/05 345/428 |
| 6,115,480 | A * | 9/2000 | Washizawa | G06T 5/20 382/156 |
| 6,144,773 | A * | 11/2000 | Kolarov | H04N 19/647 382/248 |
| 6,252,989 | B1 | 6/2001 | Geisler | H04N 19/63 375/E7.161 |
| 6,510,177 | B1 * | 1/2003 | De Bonet | H04N 19/51 375/E7.125 |
| 6,549,666 | B1 * | 4/2003 | Schwartz | H04N 19/61 375/E7.064 |
| 6,631,240 | B1 * | 10/2003 | Salesin | H04N 21/234363 348/E7.071 |
| 6,778,709 | B1 * | 8/2004 | Taubman | H04N 19/70 358/426.14 |
| 7,644,131 | B2 * | 1/2010 | Levanon | G06T 3/403 709/217 |
| 8,542,939 | B2 * | 9/2013 | Nystad | H04N 19/96 382/240 |
| 8,558,834 | B2 * | 10/2013 | Lee | H04N 19/90 345/424 |
| 8,611,652 | B2 * | 12/2013 | Jannard | H04N 19/423 382/248 |
| 8,988,443 | B2 * | 3/2015 | Croxford | G09G 5/395 345/530 |
| 9,014,496 | B2 * | 4/2015 | Nystad | H04N 19/197 382/240 |
| 9,035,807 | B2 * | 5/2015 | Jiang | G06T 17/005 341/87 |
| 9,406,155 | B2 * | 8/2016 | Oterhals | G09G 5/395 |
| 9,640,131 | B2 * | 5/2017 | Croxford | G09G 3/2022 |
| 10,009,439 | B1 * | 6/2018 | Kolam | H04L 67/02 |
| 10,096,100 | B2 * | 10/2018 | Naka | G06T 7/001 |
| 10,178,147 | B1 * | 1/2019 | Kolam | H04L 67/02 |
| 10,395,394 | B2 * | 8/2019 | Flordal | H04N 19/11 |
| 10,466,915 | B2 * | 11/2019 | Carter | H04N 19/423 |
| 10,475,370 | B2 * | 11/2019 | Spitzer | G09G 3/3275 |
| 10,504,278 | B1 * | 12/2019 | Hornbeck | G06F 3/013 |
| 10,542,277 | B2 * | 1/2020 | Stolt | H04N 19/176 |
| 10,824,357 | B2 * | 11/2020 | Flordal | G06F 3/0614 |
| 10,841,585 | B2 * | 11/2020 | Ihara | H04N 19/176 |
| 10,878,527 | B2 * | 12/2020 | Selvik | G06T 3/40 |
| 10,896,536 | B2 * | 1/2021 | Croxford | G06T 7/11 |
| 10,950,305 | B1 * | 3/2021 | Seiler | G09G 5/39 |
| 11,009,944 | B1 * | 5/2021 | Choi | G09G 3/3266 |
| 11,145,631 | B1 * | 10/2021 | Ouderkirk | H01L 25/167 |
| 2002/0057279 | A1 | 5/2002 | Jouppi | |
| 2003/0179409 | A1 * | 9/2003 | Nishida | H04N 1/40068 358/3.08 |
| 2004/0105000 | A1 * | 6/2004 | Yuri | G02B 21/244 348/79 |
| 2004/0227703 | A1 * | 11/2004 | Lamvik | G09G 3/3233 348/E5.145 |
| 2005/0094901 | A1 * | 5/2005 | Seol | G06F 16/2246 707/E17.028 |
| 2005/0163398 | A1 * | 7/2005 | Ioka | G06T 5/50 382/284 |
| 2007/0133904 | A1 * | 6/2007 | Hagiwara | G06T 3/4007 382/300 |
| 2007/0237410 | A1 * | 10/2007 | Cormode | G06K 9/00516 707/999.003 |
| 2008/0152218 | A1 * | 6/2008 | Okada | G06V 10/764 382/159 |
| 2009/0096645 | A1 * | 4/2009 | Yasuda | H03M 7/4006 341/107 |
| 2009/0141048 | A1 * | 6/2009 | Fujimoto | H04N 19/21 345/673 |
| 2009/0160872 | A1 * | 6/2009 | Gibbons | H04N 5/00 345/619 |
| 2010/0026737 | A1 * | 2/2010 | Ida | G09G 5/391 345/698 |
| 2010/0073574 | A1 * | 3/2010 | Nakajima | H04N 21/437 375/E7.076 |
| 2010/0104208 | A1 * | 4/2010 | Murata | G06T 5/003 382/255 |
| 2010/0156955 | A1 * | 6/2010 | Kimura | G09G 3/36 348/448 |
| 2010/0188396 | A1 * | 7/2010 | Mejdrich | G06T 17/005 345/419 |
| 2010/0201719 | A1 * | 8/2010 | Kimura | G06T 3/4053 345/698 |
| 2011/0013854 | A1 * | 1/2011 | Odagiri | H04N 19/42 382/245 |
| 2011/0043526 | A1 * | 2/2011 | Shiomi | H04N 7/0125 345/428 |
| 2011/0249755 | A1 * | 10/2011 | Shibahara | H04N 19/129 375/240.18 |
| 2012/0032960 | A1 * | 2/2012 | Kameyama | H04N 21/440281 345/428 |
| 2012/0086850 | A1 * | 4/2012 | Irani | G06T 3/4053 348/E7.003 |
| 2013/0195352 | A1 * | 8/2013 | Nystad | H04N 19/197 382/166 |
| 2013/0235031 | A1 * | 9/2013 | Karras | G06T 1/20 345/419 |
| 2013/0250144 | A1 * | 9/2013 | Takayama | G02B 21/367 348/239 |
| 2013/0321423 | A1 * | 12/2013 | Rossato | G06T 7/248 345/428 |
| 2014/0185668 | A1 * | 7/2014 | Jiang | H03M 7/6088 375/240.08 |
| 2014/0204107 | A1 * | 7/2014 | Laksono | H04N 19/17 345/547 |
| 2014/0267396 | A1 | 9/2014 | Doolittle | |
| 2014/0321738 | A1 * | 10/2014 | Shibata | G06N 20/00 382/160 |
| 2015/0123974 | A1 * | 5/2015 | Joo | G06T 3/4092 345/428 |
| 2015/0160446 | A1 * | 6/2015 | Kalkbrenner | G02B 21/16 250/459.1 |
| 2015/0227376 | A1 * | 8/2015 | Engh-Halstvedt | G06F 12/0855 711/140 |
| 2015/0248764 | A1 * | 9/2015 | Keskin | G06T 7/521 382/106 |
| 2016/0005344 | A1 * | 1/2016 | Stine | G06T 3/4069 345/428 |
| 2016/0035069 | A1 * | 2/2016 | Min | G06T 5/10 382/266 |
| 2016/0038092 | A1 * | 2/2016 | Golay | A61C 8/00 600/408 |
| 2016/0078600 | A1 * | 3/2016 | Perez Pellitero | G06V 30/194 382/155 |
| 2016/0180502 | A1 * | 6/2016 | Salvador Marcos | G06T 7/11 382/155 |
| 2016/0227241 | A1 * | 8/2016 | Franche | H04N 19/40 |
| 2016/0284043 | A1 * | 9/2016 | Stoye | G06T 11/40 |
| 2016/0345018 | A1 * | 11/2016 | Sadhwani | H04N 19/17 |
| 2016/0379075 | A1 * | 12/2016 | Ando | H04N 5/343 382/103 |
| 2016/0379606 | A1 * | 12/2016 | Kollin | G03H 1/0005 345/428 |
| 2017/0048245 | A1 * | 2/2017 | Owen | G06F 16/951 |
| 2017/0061894 | A1 * | 3/2017 | Ikeda | G09G 5/003 |
| 2017/0134691 | A1 * | 5/2017 | Unno | H04N 21/4621 |
| 2017/0169543 | A1 * | 6/2017 | Saquib | G06T 3/4061 |
| 2017/0178296 | A1 * | 6/2017 | Li | H04N 5/23229 |

(56) References Cited

U.S. PATENT DOCUMENTS

| | | | |
|---|---|---|---|
| 2017/0200308 A1* | 7/2017 | Nguyen | G06T 1/20 |
| 2017/0206632 A1* | 7/2017 | Milanfar | G06T 3/4053 |
| 2017/0287447 A1* | 10/2017 | Barry | G02B 27/0093 |
| 2017/0347107 A1* | 11/2017 | Teng | H04N 19/182 |
| 2017/0352165 A1* | 12/2017 | Flordal | G06T 9/00 |
| 2018/0004443 A1* | 1/2018 | Carter | G06F 3/0619 |
| 2018/0033405 A1* | 2/2018 | Tall | H04N 19/167 |
| 2018/0107271 A1* | 4/2018 | Woo | G06F 3/013 |
| 2018/0129419 A1* | 5/2018 | Flordal | G06F 3/0614 |
| 2018/0136720 A1* | 5/2018 | Spitzer | G06T 3/40 |
| 2018/0137598 A1* | 5/2018 | Spitzer | G06F 3/013 |
| 2018/0137602 A1* | 5/2018 | Spitzer | G06T 1/20 |
| 2018/0165792 A1* | 6/2018 | Tavakoli | G06T 3/0012 |
| 2018/0176535 A1 | 6/2018 | Ninan et al. | |
| 2018/0182114 A1* | 6/2018 | Hanamoto | G06T 3/0012 |
| 2018/0224935 A1* | 8/2018 | Thunström | G06T 19/20 |
| 2018/0247132 A1* | 8/2018 | Liu | G06V 20/53 |
| 2018/0260719 A1* | 9/2018 | Nori | G06N 20/00 |
| 2018/0276873 A1* | 9/2018 | Croxford | G06T 7/174 |
| 2018/0285481 A1* | 10/2018 | Czmyrid | G06T 15/04 |
| 2018/0288423 A1 | 10/2018 | Vembar | |
| 2018/0308266 A1* | 10/2018 | Surti | G06T 3/0012 |
| 2018/0332312 A1* | 11/2018 | Liu | H04N 19/157 |
| 2018/0350036 A1* | 12/2018 | VanReenen | G06T 3/0093 |
| 2018/0357752 A1* | 12/2018 | Ho | G09G 5/377 |
| 2019/0005630 A1* | 1/2019 | Li | H04N 19/169 |
| 2019/0005924 A1* | 1/2019 | Saeed | G09G 3/2096 |
| 2019/0019315 A1* | 1/2019 | Bastani | G09G 5/395 |
| 2019/0043162 A1* | 2/2019 | Saito | G09G 3/001 |
| 2019/0114829 A1* | 4/2019 | Abello Rosello | G06T 15/08 |
| 2019/0122642 A1* | 4/2019 | Morein | G09G 5/006 |
| 2019/0130630 A1* | 5/2019 | Ackerson | H04N 13/111 |
| 2019/0139267 A1* | 5/2019 | Mokrushin | H04N 19/119 |
| 2019/0141334 A1* | 5/2019 | Lim | H04N 19/117 |
| 2019/0180672 A1* | 6/2019 | Knez | G09G 5/397 |
| 2019/0206369 A1* | 7/2019 | Kempf | G06F 3/013 |
| 2019/0221185 A1* | 7/2019 | Grossman | G06F 3/14 |
| 2019/0222842 A1* | 7/2019 | Zhang | H04N 19/176 |
| 2019/0318709 A1* | 10/2019 | Wicks | G09G 5/373 |
| 2019/0347757 A1* | 11/2019 | Selvik | G06T 7/11 |
| 2019/0347792 A1* | 11/2019 | Pauly | G06T 7/11 |
| 2019/0362691 A1* | 11/2019 | Lamkin | G09G 5/391 |
| 2019/0364277 A1* | 11/2019 | Lamkin | H04N 19/59 |
| 2019/0371253 A1* | 12/2019 | Morein | H04N 19/46 |
| 2019/0391641 A1* | 12/2019 | Vanreenen | G06F 3/013 |
| 2020/0027388 A1* | 1/2020 | Iwaki | H01L 27/1225 |
| 2020/0029071 A1* | 1/2020 | Kang | H04N 19/96 |
| 2020/0045321 A1* | 2/2020 | Thirumalai | H04N 19/115 |
| 2020/0051213 A1* | 2/2020 | Nallam | G06T 15/005 |
| 2020/0051214 A1* | 2/2020 | Nallam | G09G 5/39 |
| 2020/0058263 A1* | 2/2020 | McKeever | G09G 5/001 |
| 2020/0065435 A1* | 2/2020 | Czmyrid | G06T 15/04 |
| 2020/0066024 A1* | 2/2020 | Tavakoli | G06F 3/013 |
| 2020/0066234 A1* | 2/2020 | Wang | G06F 3/14 |
| 2020/0082791 A1* | 3/2020 | Petrie | G09G 5/10 |
| 2020/0082794 A1* | 3/2020 | Sanders | G09G 5/373 |
| 2020/0090396 A1* | 3/2020 | Holmes | G06T 1/20 |
| 2020/0104708 A1* | 4/2020 | Motoki | G06N 3/04 |
| 2020/0105171 A1* | 4/2020 | Greenebaum | G06T 3/4069 |
| 2020/0152105 A1* | 5/2020 | Ishii | G02B 27/0172 |
| 2020/0167999 A1* | 5/2020 | Schmit | G06F 3/013 |
| 2020/0184933 A1* | 6/2020 | Nijs | G06T 5/002 |
| 2020/0288134 A1* | 9/2020 | Lim | H04N 19/129 |
| 2020/0311945 A1* | 10/2020 | Lim | G06T 7/11 |
| 2020/0322616 A1* | 10/2020 | Sakomizu | H04N 19/85 |
| 2021/0004932 A1* | 1/2021 | Newman | H04N 13/156 |
| 2021/0011646 A1* | 1/2021 | Nystad | G06T 1/60 |
| 2021/0042550 A1* | 2/2021 | Nagato | G06N 20/00 |
| 2021/0063741 A1* | 3/2021 | Riguer | G06F 3/013 |
| 2021/0065437 A1* | 3/2021 | Brkic | G06T 15/405 |
| 2021/0067791 A1* | 3/2021 | Ye | H04N 19/44 |
| 2021/0084219 A1* | 3/2021 | Ito | H04N 5/22541 |
| 2021/0097642 A1* | 4/2021 | Selvik | G06T 15/005 |
| 2021/0104014 A1* | 4/2021 | Kolb, V | G06T 5/20 |
| 2021/0110514 A1* | 4/2021 | Anger | G06K 9/6289 |
| 2021/0120261 A1* | 4/2021 | Lim | H04N 19/176 |
| 2021/0136364 A1* | 5/2021 | Ko | H04N 19/105 |
| 2021/0136416 A1* | 5/2021 | Kim | H04N 19/176 |
| 2021/0168377 A1* | 6/2021 | Sarwer | H04N 19/182 |
| 2021/0174768 A1* | 6/2021 | Jarvenpaa | G09G 5/37 |
| 2021/0176479 A1* | 6/2021 | Liao | H04N 19/136 |
| 2021/0210054 A1* | 7/2021 | Baijal | G06T 5/003 |
| 2021/0210177 A1* | 7/2021 | Lee | G16Z 99/00 |
| 2021/0227221 A1* | 7/2021 | Lim | H04N 19/119 |
| 2021/0227222 A1* | 7/2021 | Lee | H04N 19/172 |
| 2021/0235072 A1* | 7/2021 | Ko | H04N 19/105 |
| 2021/0279916 A1* | 9/2021 | Simon | H04N 19/176 |
| 2021/0287633 A1* | 9/2021 | Rai Kurlethimar | G09G 5/38 |
| 2022/0068243 A1* | 3/2022 | Croxford | G06T 1/20 |

FOREIGN PATENT DOCUMENTS

| | | |
|---|---|---|
| WO | 98/33315 | 7/1998 |
| WO | 01/03070 | 1/2001 |
| WO | 2015/128634 | 9/2015 |

OTHER PUBLICATIONS

GB Combined Search and Examination Report dated May 3, 2019, GB Patent Application No. GB1818163.6.

Martin, et al., "Data Processing Systems," U.S. Appl. No. 16/675,644, filed Nov. 6, 2019.

Non-Final Office Action dated May 28, 2021 in U.S. Appl. No. 16/675,644.

Response to Non-Final Office Action dated Nov. 29, 2021 in U.S. Appl. No. 16/675,644.

Final Office Action dated Feb. 7, 2022 in U.S. Appl. No. 16/675,644.

Response to Final Office Action dated Jul. 29, 2022 in U.S. Appl. No. 16/675,644.

Non-Final Office Action dated Aug. 31, 2022 in U.S. Appl. No. 16/675,644.

* cited by examiner

DATA PROCESSING SYSTEMS

BACKGROUND

The technology described herein relates to data processing systems and in particular to techniques for encoding data in data processing systems.

It is common in data processing systems to encode an array of data elements, such as an array of image data values (e.g. frames of video data or graphics data for display), so as to compress the data in order to reduce bandwidth and memory consumption. This is particularly desirable in data processing apparatus, e.g. of portable devices, where processing resources and power may be limited.

In order to encode an array of data elements, the array of data elements is often divided into smaller blocks (sub-regions) of data elements and encoded on a block by block basis.

US Patent Application No. 2013/0034309 describes a lossless encoding technique for encoding an array of data elements in which a quadtree representation is generated for each block of the data array, where each leaf node of the quadtree represents a respective data element of the data array, and where the data values for the nodes of the tree are set such that the data value for the data element that a leaf node represents is given by the sum of the data values in the tree for the leaf node and each preceding parent node in the branch of the tree that the leaf node belongs to.

The Applicants believe that there remains scope for improvements to techniques for encoding arrays of data elements.

BRIEF DESCRIPTION OF THE DRAWINGS

Various embodiments of the technology described herein will now be described by way of example only and with reference to the accompanying drawings, in which.

DETAILED DESCRIPTION

Figure 1:
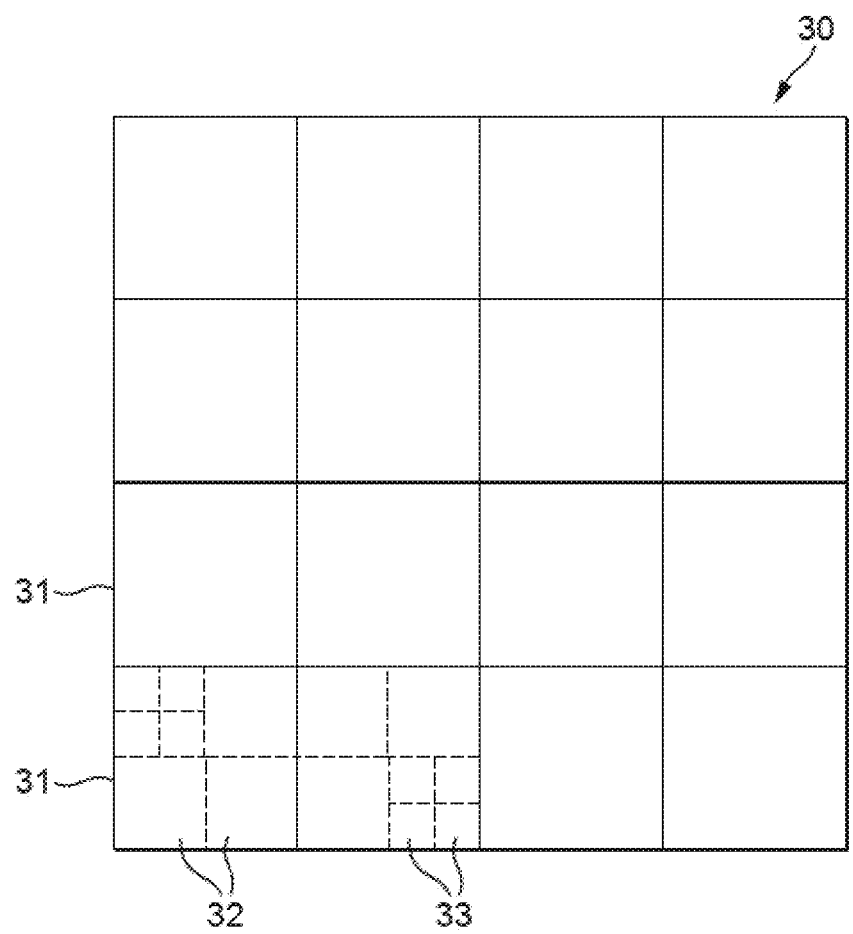
FIG. 1 shows schematically an array of data that may be encoded in accordance with embodiments of the technology described herein.

An embodiment of the technology described herein comprises a method of operating a data processing system, the data processing system comprising:

encoding circuitry operable to encode arrays of data elements;

decoding circuitry operable to decode encoded versions of arrays of data elements; and consumer circuitry operable to use arrays of data elements;

the method comprising:

the encoding circuitry encoding an array of data elements so as to produce an encoded version of the array of data elements by: dividing the array of data elements into plural separate blocks, generating a respective representation for representing each different block that the array of data elements is divided into, and generating data representing each representation so as to represent the array of data elements as an encoded version of the array of data elements;

the decoding circuitry decoding at least part of the encoded version of the array of data elements to produce a decoded version of the array of data elements; and the consumer circuitry using at least part of the decoded version of the array of data elements;

wherein the method further comprises:

providing to the encoding circuitry data indicative of a resolution that is to be used by the consumer circuitry for at least one region of the array of data elements; and the encoding circuitry using the data indicative of the resolution that is to be used by the consumer circuitry to control the generation of the representation for representing at least one block that the array of data elements is divided into.

Another embodiment of the technology described herein comprises a data processing system comprising:

encoding circuitry operable to encode arrays of data elements;

decoding circuitry operable to decode encoded versions of arrays of data elements; and consumer circuitry operable to use arrays of data elements;

wherein:

the encoding circuitry is configured to encode an array of data elements so as to produce an encoded version of the array of data elements by: dividing the array of data elements into plural separate blocks, generating a respective representation for representing each different block that the array of data elements is divided into, and generating data representing each representation so as to represent the array of data elements as an encoded version of the array of data elements;

the decoding circuitry is configured to decode at least part of the encoded version of the array of data elements to produce a decoded version of the array of data elements; and the consumer circuitry is configured to use at least part of the decoded version of the array of data elements;

and wherein:

the data processing system is configured to provide to the encoding circuitry data indicative of a resolution that is to be used by the consumer circuitry for at least one region of the array of data elements; and the encoding circuitry is configured to use the data indicative of the resolution that is to be used by the consumer circuitry to control the generation of the representation for representing at least one block that the array of data elements is divided into.

Various embodiments of the technology described herein relate to a data processing system in which an array of data elements, such as an array of image data values (e.g. a frame of video data or graphics data for display), is encoded, decoded and then used (e.g. displayed). Encoding the data array (e.g. when it is produced), and then subsequently decoding the data array when it is to be used (e.g. when it is to be displayed), can beneficially reduce bandwidth and memory consumption of the data processing system.

In the technology described herein, the data array is encoded by generating a respective representation, such as a tree representation, for each of plural separate different blocks that the array is divided into, and by then generating data to represent each (tree) representation, e.g. in a manner that is similar to that described in US Patent Application No. 2013/0034309 (the contents of which is incorporated herein by reference in its entirety). As described in US Patent Application No. 2013/0034309, encoding a data array in this manner is a particularly efficient and convenient technique for encoding and compressing the data array.

Moreover, in various embodiments of the technology described herein, data indicative of a resolution at which at least one region of the decoded data array is to be used by the consumer circuitry is provided to the encoding circuitry, and the encoding circuitry is configured to use the data to control its encoding operation, in particular to control the generation of the (tree) representation for representing at least one block of the data array. Thus, for example, instead of simply generating each (tree) representation for representing each block of the data array in the same manner (e.g. using the same algorithm), one or more or each (tree) representation for representing one or more or each block of the data array can be generated in a different manner (e.g. using a different algorithm), i.e. depending on the resolution at which the corresponding region of the decoded data array is (eventually) to be used by the consumer circuitry.

As will be described in more detail below, this facilitates greater flexibility and control over the encoding operation, and in particular can facilitate the use of even less data to represent the data array (and thereby compression of the data array) relative to its original form and relative to the compressed data array described in US Patent Application No. 2013/0034309.

For example (and in various embodiments), where a particular region of the decoded data array is to be used (e.g. displayed) by the consumer circuitry at a relatively low (e.g. reduced) resolution, then the data that is provided to the encoding circuitry can be used by the encoding circuitry to control the generation of the (tree) representation in the encoding process such that one or more blocks of the data array (e.g. that correspond to the particular region) are encoded using a relatively high (e.g. increased) level of compression, such as by using lossy compression, such as a lossy version of the encoding technique described in US Patent Application No. 2013/0034309 (which will be described in more detail below).

Where on the other hand, another particular region of the decoded data array is to be used (e.g. displayed) by the consumer circuitry at a relatively high (e.g. increased or normal) resolution, then the data that is provided to the encoding circuitry can be used by the encoding circuitry to control the generation of the (tree) representation in the encoding process such that one or more blocks of the data array (e.g. that correspond to the other particular region) are encoded using a relatively low (e.g. normal or reduced) level of compression, such as by using lossless compression, such as the lossless compression technique described in US Patent Application No. 2013/0034309.

This means that, where appropriate, at least some regions of the array can be compressed using a higher level of compression (such as by using lossy compression), which in turn means that the overall memory bandwidth and power requirements of the system can be reduced. As such, the memory bandwidth and power use for processing a given data array can be reduced, and/or larger data arrays can be processed using the same amount of memory bandwidth and power.

Moreover, this can be done without significantly affecting the quality of the data array when it is used (e.g. displayed) by the consumer circuitry. This is because when one or more regions of the (decoded version of the) array of data elements are to be used (e.g. displayed) with a relatively low resolution (e.g. with a reduced resolution relative to the (highest) resolution at which the data array was generated), some of the data will effectively need to be discarded, and it will not matter which stage in the processing that this happens. Discarding this data during the encoding process allows the data to be discarded at a relatively early stage in the processing, and in a particularly convenient and efficient manner.

It will be appreciated, therefore, that the technology described herein provides an improved method of operating a data processing system.

The technology described herein also extends to the operation solely of encoding circuitry encoding an array of data elements in the manner of the technology described herein.

Thus, another embodiment of the technology described herein comprises a method of encoding an array of data elements using encoding circuitry of a data processing system, the method comprising:

the encoding circuitry encoding the array of data elements so as to produce an encoded version of the array of data elements by: dividing the array of data elements into plural separate blocks, generating a respective representation for representing each different block that the array of data elements is divided into, and generating data representing each representation so as to represent the array of data elements as an encoded version of the array of data elements;

wherein the method further comprises:

providing to the encoding circuitry data indicative of a resolution at which at least one region of the array of data elements is to be used; and the encoding circuitry using the data indicative of the resolution at which the at least one region of the array of data elements is to be used to control the generation of the representation for representing at least one block that the array of data elements is divided into.

Another embodiment of the technology described herein comprises a data processing system comprising:

encoding circuitry configured encode an array of data elements so as to produce an encoded version of the array of data elements by: dividing the array of data elements into plural separate blocks, generating a respective representation for representing each different block that the array of data elements is divided into, and generating data representing each representation so as to represent the array of data elements as an encoded version of the array of data elements;

wherein the data processing system is configured to provide to the encoding circuitry data indicative of a resolution at which at least one region of the array of data elements is to be used; and the encoding circuitry is configured to use the data indicative of the resolution at which at least one region of the array of data elements is to be used to control the generation of the representation for representing at least one block that the array of data elements is divided into.

The array of data elements that is encoded by the encoding circuitry can be any suitable data array. It should comprise a plurality of data elements (entries), each occupying different positions in the array. The data array may be an image (may represent an image). In various embodiments the data array is a frame of (image) (e.g. colour) data, e.g. for display, or a graphics texture. It would also be possible for the array of data elements to comprise an array of other graphics data, such as an array of depth data.

In an embodiment, the array of data elements is a frame that is generated for display for an application, such as a game, and in an embodiment for an augmented reality or virtual reality application. Each array of data elements (frame) accordingly in an embodiment comprises an image to be displayed.

The data array element data values can take any suitable and desired form, and will depend upon the nature of the data array being encoded, e.g. whether it is a texture, an image, a frame, etc. In the case of a texture, for example, the data array element data values should be texture data (texel values). Such texture data could comprise, e.g., a set of colour values (Red, Green, Blue (RGB), a set of colour and transparency values (Red, Green, Blue, Alpha (RGBa)), a set of luminance and chrominance values, a set of shadow (light) map values, a set of a normal map (bump map) values, z values (depth values), stencil values, luminance values (luminance textures), luminance alpha textures, and/or gloss maps, etc.

In the case of an image or frame for display, the data array element data values should be pixel and/or sampling position data (data values). Such pixel data could comprise, e.g., appropriate colour (RGB) values, or luminance and chrominance values, etc.

The array of data elements may be generated in any suitable manner. The array of data elements may be generated by (and the data processing system may comprise) producer circuitry, which may comprise, for example, a graphics processing unit (GPU), a video processor/codec or video engine (video processing unit (VPU)), a digital camera image signal processor (ISP), an image processor, and/or a central processing unit (CPU), etc. There may be more than one producer circuit, if desired. In an embodiment, the producer circuitry is a graphics processor or a video processor.

The producer circuitry should generate its array in an appropriate manner, e.g. by rendering the array in the case of a graphics processor, by appropriately decoding input encoded video data in the case of a video processor, from a captured image in the case of a digital camera image signal processor (ISP), etc.

Once generated, the array of data elements should be (and is in an embodiment) provided (sent) to the encoding circuitry for encoding.

The encoding circuitry may comprise any suitable such circuit that is operable to encode an array of data elements to as to produce an encoded version of the array of data elements, and may encode arrays of data elements in any suitable manner.

The encoding circuitry is in an embodiment operable to encode arrays of data elements generated by the producer circuitry. Thus, the method in an embodiment comprises the encoding circuitry encoding the array of data elements generated by the producer circuitry. The encoding circuitry may encode only part of the overall data array (e.g. frame, image or texture) generated by the producer circuitry, but in an embodiment encodes the entire array (e.g. frame, image or texture) generated by the producer circuitry.

To facilitate this, the encoding circuitry may (and in various embodiments does) form part of the producer circuitry, e.g. may be (integrated) encoding circuitry of a graphics processing unit (GPU), a video processor/codec or video engine (video processing unit (VPU)), a digital camera image signal processor (ISP), an image processor, and/or a central processing unit (CPU), etc. Thus, in these embodiments, the producer circuitry both generates the array of data elements, and encodes the array (using its encoding circuitry).

In various other embodiments, the encoding circuitry may be separate to, e.g. may be a separate circuit (e.g. integrated circuit) to the producer circuitry, e.g. may comprise a "standalone" encoding unit, e.g. that is configured to receive (and encode) arrays of data elements from the producing circuitry.

Once produced (encoded), the encoded array of data elements may be stored, e.g. in a buffer such as a frame buffer, in memory, from where it may then be read (e.g. by the decoding circuitry). The memory where the encoded array may be stored may comprise any suitable memory and may be configured in any suitable and desired manner. For example, it may be a memory that is on chip with the encoding circuitry, or it may be an external memory. In an embodiment it is in external memory, such as a main memory of the overall data processing system. It may be dedicated memory for this purpose, or it may be part of a memory that is used for other data as well.

The encoding circuitry is operable to encode the array of data elements so as to produce an encoded version of the array of data elements by: dividing the array of data elements into plural separate blocks, generating a respective representation for representing each different block that the array of data elements is divided into, and generating data representing each representation so as to represent the array of data elements as an encoded version of the array of data elements.

Thus, in various embodiments, in the encoding operation, the data array is divided into plural separate regions or blocks, and a respective representation such as a tree representation is generated for each different block (region) that the data array is divided into. That is, plural (e.g. tree) representations are generated, one (e.g. tree) representation for each block that the array of data elements is divided into. Data representing the plural representations is then generated so as to produce an encoded version of the array of data elements.

The blocks (regions) that the data array to be encoded is divided into can take any suitable and desired form. Each block should comprise a sub-set of the data elements (positions) in the array, i.e. correspond to a particular region of the array. In an embodiment the array is divided into non-overlapping and regularly sized and shaped blocks. The blocks are in an embodiment square, but other arrangements could be used if desired. The blocks may correspond to a block size that will otherwise be used in the data processing system in question. Thus for example, in the case of a tile based graphics processing system, the blocks may correspond to (have the same size and configuration as) the tiles that the rendering process of the graphics processing system operates on.

In an embodiment, the data array is divided into 16×16 blocks (i.e. blocks of 16×16 array positions (entries)). In one such arrangement, a single tree representation is generated for each 16×16 block. Thus, in the case of a texture map, for example, a separate tree representation would be generated for each (non-overlapping) 16×16 texel region of the texture map, and in the case of an image or a frame, a tree representation would be generated for each 16×16 pixel or sampling position region of the image or frame.

Other arrangements would, of course, be possible. For example, instead of generating a single tree representation for a 16×16 block, four trees, each representing an 8×8 or a 16×4 block within the 16×16 block could be generated (in effect therefore, the data array would be divided into 8×8 or 16×4 blocks).

Each representation may comprise any suitable representation for representing a block of the data array. In various embodiments, one or more or each representation comprises a tree representation, e.g. as described in US Patent Application No. 2013/0034309. Thus, according to various embodiments, the encoding circuitry is operable to encode the array of data elements so as to produce an encoded version of the array of data elements by: dividing the array of data elements into plural separate blocks, generating a respective tree representation for representing each different block that the array of data elements is divided into, and generating data representing each tree representation so as to represent the array of data elements as an encoded version of the array of data elements. Other representation(s) may be (and in various embodiments are) used.

The encoding operation will be described in more detail below.

The decoding circuitry may comprise any suitable such circuitry that is operable to decode encoded versions of arrays of data elements, and may decode encoded versions of arrays of data elements in any suitable manner.

The decoding circuitry is in an embodiment operable to decode arrays of data elements encoded by the encoding circuitry. To do this, the decoding circuitry in an embodiment receives at least part of the encoded version of the array of data elements, e.g. by reading the encoded array from the memory in which the encoded array is stored.

The decoding circuitry should (read and) decode at least part of the encoded version of the array of data elements to produce a decoded version of the array of data elements. The decoding circuitry should (and in an embodiment does) (read and) decode at least those parts of the (encoded) data array that are to be used by the consumer circuitry. This may comprise (reading and) decoding some (but not all) of the encoded data array (e.g. frame, image or texture), but in an embodiment comprises (reading and) decoding all of (the entire) encoded data array (e.g. frame, image or texture).

The decoded version of the array of data elements that is produced by the decoding circuit should (and in an embodiment does) comprise a decoded version of at least part of, and in an embodiment all of, the array of data elements produced by the producer circuitry.

Once produced (decoded), the decoded data array should be (and is in an embodiment) provided by (e.g. sent from) the decoding circuitry to the consumer circuitry for use.

To facilitate this, the decoding circuitry may (and in various embodiments does) form part of the consumer circuitry, e.g. may be (integrated) decoding circuitry of a display controller or a graphics processing unit (GPU), etc. Thus, in these embodiments, the consumer circuitry both decodes the encoded version of the array of data elements (using its decoding circuitry) and uses the decoded version of the array of data elements.

In various other embodiments, the encoding circuitry may be separate to, e.g. a separate circuit (e.g. integrated circuit) to the consumer circuitry, e.g. may comprise a "standalone" decoding unit, which may be configured to decode and provide (send) arrays of data elements to the consumer circuitry.

The decoding circuitry is in an embodiment operable to decode arrays of data in the manner described in US Patent Application No. 2013/0034309. As will be described in more detail below, the encoding operation of various embodiments is in an embodiment configured to be transparent to the decoding circuitry, i.e. so that the decoding operation that is required to decode each encoded array of data elements (and each block of each encoded array of data elements) is the same (and does not need to be changed), regardless of differences in the manner in which the (e.g. tree) representation(s) is generated for different data arrays and/or for different data array blocks in the encoding operation.

Thus, the method may comprise decoding at least part of the encoded version of the array of data elements by using data representing a representation that represents some or all of the data elements of the data array to determine a value to be used for each data element of some or all of the data elements of the data array.

Similarly, in various embodiments, the decoding circuitry may be configured to use data representing a representation that represents some or all of the data elements of the data array to determine a value that is to be used for each data element of some or all of the data elements of the data array.

In various embodiments, the method may comprise decoding at least part of the encoded version of the array of data elements by:

using data representing a tree representing some or all of the data elements of the data array to determine the value of each node of a branch of the tree representing some or all of the data elements of the data array; and determining the value to be used for a data element of the data array by summing the determined values for the leaf node of the branch of the tree and for each preceding parent node in the branch of the tree that the leaf node belongs to.

Similarly, in various embodiments, the decoding circuitry may be configured to:

use data representing a tree representing some or all of the data elements of the data array to determine the value of each node of a branch of the tree representing some or all of the data elements of the data array; and determine the value to be used for a data element of the data array by summing the determined values for the leaf node of the branch of the tree and for each preceding parent node in the branch of the tree that the leaf node belongs to.

The decoding operation is described in more detail in US Patent Application No. 2013/0034309, which is incorporated herein by reference.

The consumer circuitry may comprise any suitable such circuitry that is operable to use arrays of data elements, and may use such data arrays in any suitable manner.

The consumer circuitry is in an embodiment operable to use decoded arrays of data elements produced (decoded) by the decoding circuitry. The consumer circuitry may use (e.g. display) only part (some but not all) of the decoded version of the array of data elements (e.g. frame, image or texture), but in an embodiment uses (e.g. displays) all (the entire) decoded array (e.g. frame, image or texture). The array of data elements that is used (e.g. displayed) by the consumer circuitry should (and in an embodiment does) comprise a decoded version of at least part of, and in an embodiment all of, the array of data elements generated by the producer circuitry.

The nature of the consumer circuitry will depend upon the nature of the data array being used.

Thus, for example, where the array of data elements comprises a frame or image for display (e.g. generated by a graphics processing unit (GPU), a video processor, a digital camera image signal processor (ISP), an image processor, and/or a central processing unit (CPU), etc.), then the consumer circuitry may comprise, for example, a display controller or a display processor operable to provide the (decoded version of the) array of data elements to a display for display. As such, using the decoded version of the array of data elements in an embodiment comprises providing the (optionally processed) decoded version of the array of data elements (e.g. frame or image) to a display for display (i.e. displaying the (optionally processed) decoded version of the array of data elements (e.g. frame or image)).

Where the array of data elements comprises a texture (e.g. generated by a graphics processing unit (GPU)), then the consumer circuitry may comprise, for example, a graphics processing unit (GPU). In this case, the consumer graphics processing unit (GPU) may be the same as the producer graphics processing unit (GPU) (i.e. a graphics processing unit (GPU) may generate and then subsequently use the texture), or the consumer graphics processing unit (GPU) may be a different graphics processing unit (GPU) to the producer graphics processing unit (GPU). As such, using the decoded version of the array of data elements in an embodiment comprises using the decoded version of the array of data elements (e.g. texture) during a (subsequent) rendering operation. In this case, the array (e.g. texture) may be used in the (subsequent) rendering operation in any suitable manner, according to any suitable graphics processing technique (that requires the use of a texture).

In embodiments, the consumer circuitry comprises a display processor operable to provide arrays (e.g. frames or images) to a display for display.

The display processor can comprise any suitable and desired display processor that is operable to provide data arrays (e.g. frames or images) (e.g. generated by producer circuitry of the data processing system) to a display for display. The display processor is in an embodiment operable to read (encoded or decoded) data of arrays from memory, optionally decode encoded arrays (as described above), optionally perform appropriate "display processing" on those arrays, and then provide the optionally processed arrays to the display for display. In an embodiment, the display processor provides data arrays to the display for display via a "direct" connection to the display, i.e. is operable to stream the data for the arrays (frames or images) to the display, rather than transferring the arrays to the display via memory for example. The display processor may have a wired or wireless connection to the display.

Thus, the display processor may include an input stage operable to read data of input (encoded or decoded) data arrays from memory where that data is stored. In an embodiment, the input stage comprises a memory read sub-system, that in an embodiment comprises a read controller, such as for example a Direct Memory Access (DMA) read controller, configured to (operable to) read data of input data arrays from a memory in which the input data arrays are stored.

The display processor may include an output stage operable to provide an output (decoded) data array (frame or image) for display to a display, e.g. to cause the output data array for display to be displayed on the display. The output stage in an embodiment comprises appropriate timing control functionality (e.g. it is configured to send pixel data to the display with appropriate horizontal and vertical blanking periods), for the display. The output stage in an embodiment sends an output data array (frame or image) directly to the display for display, e.g., and in an embodiment, as a stream of data elements (pixels) for display. The data may be provided via a wired or wireless connection to the display, as desired.

In these embodiments, the data processing system in an embodiment comprises a display operable to display data arrays (e.g. images or frames for display).

The display will operate to display the received data array (frame or image) (e.g., and in an embodiment, in the normal manner of operation for the display in question). Thus, the data elements (pixels) for the data array will be appropriately scanned onto the panel of the display, to display the data array.

It will be appreciated that, as described above, in various embodiments, an array of data elements (e.g. a frame, image or texture) is generated, encoded, decoded and then used (e.g. displayed). Although it would be possible for the array of data elements only to be encoded and decoded after being generated and before being used (displayed), in various embodiments the array of data elements is also processed, e.g. subjected to image, graphical or other processing, after being generated and before being used (displayed).

Where present, such processing may comprise any suitable such processing and may be carried out in any suitable manner by any suitable element of the data processing system. In various embodiments, the array of data elements may be processed before being encoded and/or after being decoded. For example (and as described above), the display processor may perform suitable display processing (e.g. on the decoded data array) such as composition, scaling, and the like, on the decoded array of data elements, before providing the processed decoded data array to the display for display.

Other arrangements would be possible.

In the technology described herein, data indicative of a resolution that is to be used by the consumer circuitry for at least one region of the (decoded version of the) array of data elements (i.e. resolution-indicating data) is provided to the encoding circuitry, and the encoding circuitry uses the data to control the generation of the (tree) representation for representing at least one block that the array of data elements is divided into. Thus in an embodiment data indicative of the resolution or resolutions that is or are to be used by the consumer circuitry in respect of one or more regions of the (decoded version of the) array of data elements is generated and provided to the encoding circuitry for use by the encoding circuitry when encoding the array of data elements.

In various embodiments, the data processing system is configured such that the consumer circuitry (e.g. display processor or GPU) uses (decoded) arrays of data elements according to (having) one or more resolutions. In an embodiment, the consumer circuitry (e.g. display processor or GPU) uses (decoded) arrays of data elements according to (having) plural different resolutions. Correspondingly, the resolution-indicating data is in an embodiment indicative of plural different resolutions that are to be used by the consumer circuitry.

The plural different resolutions can be any suitable set of resolutions. There may be a highest resolution that is to be used (e.g. displayed) for one or more regions of the data array, and there may then be one or more lower resolutions that is or are to be used (e.g. displayed) for other regions of the data array. There could be just two different resolutions, a highest resolution and a lower resolution. Alternatively, three or more different resolutions for an array could be used, comprising a highest resolution and two or more lower resolutions for the data array.

The plural different resolutions (that are used by the consumer circuitry, and that are indicated by the resolution-indicating data) may be in respect of each of plural (e.g. successive) data arrays, i.e. the data processing system may be configured such that each data array of plural different (e.g. successive) data arrays are used according to a respective different resolution. That is, plural different resolutions may be used (and indicated by the resolution-indicating data), one resolution for each of plural different (e.g. successive) data arrays. In this case, where using the data array comprises providing the data array to a display (i.e. displaying the data array), the method may comprise providing a sequence of successive data arrays to the display (i.e. displaying a sequence of successive (decoded) data arrays), where each data array of plural different data arrays of the sequence is provided to the display with (i.e. is displayed at) a respective different resolution (and the resolution-indicating data may be indicative of each of the respective different resolutions).

Additionally or alternatively, the plural different resolutions (that are used by the consumer circuitry, and that are indicated by the resolution-indicating data) may be in respect of each of plural different regions of a data array, i.e. the data processing system may be configured such that each data array region of plural different data array regions of a data array are used according to a respective different resolution. That is, plural resolutions may be used (and indicated by the resolution-indicating data), one resolution for each of plural different data array regions of a data array. In this case, where using the data array comprises providing the data array to a display (i.e. displaying the data array), the method may comprise providing the data array to the display (i.e. displaying a (decoded) data array), where each region of plural different regions of the data array is provided to the display with (i.e. is displayed at) a respective different resolution (and the resolution-indicating data may be indicative of each of the respective different resolutions).

Thus, the resolution-indicating data may be indicative of a resolution that is to be used by the consumer circuitry in respect of only one region of the (decoded version of the) array of data elements, or may be indicative of a resolution that is to be used for plural different regions of the (decoded version of the) array of data elements. The resolution-indicating data may be indicative of a resolution that is to be used for some but not all of the (decoded version of the) array of data elements (in which case, it could be assumed (by the encoding circuitry) that any non-indicated regions are to be used by the consumer circuitry according to, for example, a default resolution), but is in an embodiment indicative of a resolution that is to be used for all of (each and every region of) the (decoded version of the) array of data elements.

In embodiments, the resolution-indicating data is indicative of a resolution that is to be used by the consumer circuitry for each of plural different regions that the (decoded version of the) array of data elements is divided into.

The different regions that the (decoded) data array is divided into and for which an indication of which different resolution is to be used for that region is provided can comprise any suitable and desired subdivision of the (decoded) array into a plurality of regions. The regions are in an embodiment all the same size and configuration, and in an embodiment rectangular, and in an embodiment square. Each region could correspond to a single data element (pixel) in the decoded array, but in an embodiment each region corresponds to a, in an embodiment rectangular, and in an embodiment square, block of plural data elements (pixels) in the decoded array.

In embodiments, the regions that the (decoded) data array is divided into and for which an indication of which different resolution is to be used for that region is provided correspond to the plural blocks that the data array is divided into for encoding purposes. Thus, in an embodiment the method comprises providing (and the data processing system is in an embodiment configured to provide) to the encoding circuitry data indicative of a resolution that is to be used by the consumer circuitry for each different block that the array of data elements is divided into.

The resolution-indicating data can take any suitable and desired form, and can indicate the different resolution that is to be used in any suitable and desired manner.

In embodiments, this data is in the form of a two-dimensional array representing the (area of the) (decoded) data array, with respective data element positions within the array then indicating which resolution is to be used for that region within the data array. Such an array could be, for example, in the form of a 2D texture, or "density map", describing which resolution is to be used for respective regions of the data array.

In such a case, the "density map" may indicate the resolution that is to be used for respective regions at any desired level of granularity (resolution) (sub division into regions) across the area of the data array. Thus each "density map" data element in an embodiment corresponds to a region comprising a given block of plural data elements (pixels) in the data array.

In an embodiment the two dimensional array (density texture/map) is of a particular size, such as 64×64, 100×100, 128×128 or 256×256 data element positions, with each data element position in the array then mapping to a corresponding region (block) of the data array.

In these embodiments, the resolution that is to be used for a given region of the data array can be indicated in any suitable and desired manner. For example, the data could indicate a single one of the plural different resolutions that is to be used for a (and each) array region, e.g. using an integer value. The data indicating the different resolutions to be used could also or instead be provided in other forms, for example by means of a lookup table, or by some form of functional representation, or in the form of a bounding box (e.g. a 2D axis-aligned bounding box) that defines the area (region(s)) where a highest resolution is to be used (with all other regions then being assumed to be used with a or the lower resolution) (and in one embodiment this is the case). The latter arrangement may be particularly applicable where only two different resolutions are to be used.

In various embodiments, it is determined which resolution (s) is to be used by the consumer circuitry, and the resolution-indicating data is then generated on that basis (and then provided to the encoding circuitry). The determination of which resolution is to be used by the consumer circuitry and the generation of the data indicating that can be done in any suitable manner by any suitable and desired component or processor of the data processing system. For example, the determination of which resolution is to be used where for the array and the generation of the data, such as the density map/texture, indicating that, could be and is in an embodiment, done by the application that is requiring the display of the frames.

The resolution indicating data should be (and in various embodiments is) determined and generated (and then provided to the encoding circuitry) before the array of data elements is encoded by the encoding circuitry. Thus, in various embodiments, the resolution at which at least one region of the (decoded version of the) array of data elements is to be used by the consumer circuitry is known, prior to the array of data elements being encoded, and prior to the decoded version of the array of data elements being used by the consumer circuitry.

In the technology described herein, the encoding circuitry uses the data indicative of the resolution that is to be used by the consumer circuitry to control the generation of the representation for representing at least one block that the array of data elements is divided into.

The encoding circuitry may use the data to control the generation of the representation for representing only one block of the data array, but in an embodiment uses the data to control the generation of the representation for representing each of plural different blocks of the array of data elements. The encoding circuitry may use the data to control the generation of the representation for representing some but not all blocks of the array of data elements (in which case, it could be assumed (by the encoding circuitry) that any non-indicated blocks are to be encoded, for example, in a default manner), but in an embodiment uses the data to control the generation of the representation for representing each and every block (all of the blocks) that the array of data elements is divided into.

The encoding circuitry should (and does in an embodiment) use the data to control the generation of the representation for representing at least those blocks of the data array that correspond to (that are within) the at least one region indicated by the resolution-indicating data, e.g. to control the generation of the representation for representing at least those blocks of the data array that are indicated by the resolution-indicating data.

Thus, for example, where the resolution-indicating data is indicative of a resolution for each of plural different regions (as described above), the encoding circuitry in an embodiment uses the data to control the generation of at least those blocks of the data array that correspond to (that are within) the plural different regions. In embodiments, where the resolution-indicating data is indicative of a resolution for each of plural different blocks that the data array is divided into for encoding purposes (as described above), the encoding circuitry uses the data to control the generation of the representation for representing each of the plural blocks. Thus, the method in an embodiment comprises the encoding circuitry using (and the encoding circuitry is in an embodiment configured to use) the data to control the generation of the representation for representing each of plural different blocks that the array of data elements is divided into.

The generation of the representation for representing a block can be controlled in any suitable manner. In embodiments, the encoding circuitry uses the data to determine how the representation should be generated for a block (and generates the representation for the block in the so-determined manner).

In an embodiment, the encoding circuitry uses the data to select one (type of) representation to use to represent the block from a plurality of possible (types of) representations, and then generates the selected (type of) representation for representing the block. The encoding circuitry will accordingly encode the data array in accordance with the resolution-indicating data, which effectively indicates to the encoding circuitry which of the different (types of) representation should be used for respective regions (blocks) of the data array.

Thus, the method in an embodiment comprises the encoding circuitry using (and the encoding circuitry is in an embodiment configured to use) the data to select, for each block of the at least one block, a (type of) representation for representing that block from a plurality of (types of) representations, and generating the selected (type of) representation for representing that block.

The plural (types of) representation can be any suitable set of representations. In embodiments, the plural representations differ in respect of their fidelity (lossiness). That is, each of the possible (types of) representations in an embodiment represents a block with a respective different degree of fidelity (lossiness).

In embodiments, there is a highest fidelity (type of) representation, and one or more lower fidelity (types of) representations. There could be just two different representations, a highest fidelity representation and a lower fidelity representation. Alternatively, three or more different fidelity representations could be used, comprising a highest fidelity representation and two or more lower fidelity representations.

Thus, in embodiments, the encoding circuitry uses the resolution-indicating data to select, for each block of the at least one block, either a higher fidelity (type of) representation for representing that block or a lower fidelity (type of) representation for representing that block, and generates the selected (type of) representation for representing that block.

In embodiments, the highest fidelity (type of) representation comprises a lossless (type of) representation (i.e. in which the representation for representing a given block is generated in a lossless manner), and the one or more lower fidelity (types of) representation comprise lossy (types of) representation (i.e. in which the representation for representing a given block is generated in a lossy manner).

This is in an embodiment such that when, as part of the encoding operation, a representation is generated for representing a particular block using the highest fidelity, lossless, representation, the (overall) encoding operation for encoding the particular block is lossless. When, on the other hand, as part of the encoding operation, a representation is generated for representing another particular block using a lower fidelity, lossy, representation, the (overall) encoding operation for encoding the other particular block is lossy.

Thus, in embodiments, the encoding circuitry uses the resolution-indicating data to select, for each block of the at least one block, either a lossless (type of) representation for representing that block or a lossy (type of) representation for representing that block, and generates the selected (type of) representation for representing that block.

Where there are plural lossy (types of) representation, each of the plural lossy (types of) representation may differ in respect of the degree (level) of lossiness. Thus, there may be a least lossy (type of) representation, and one or more lossy (types of) representation. In these embodiments, the encoding circuitry may use the data to select, for each block of the at least one block, a degree (level) of lossiness to use for representing that block (and generates the representation for representing that block using the selected degree (level) of lossiness).

In embodiments, where the data indicates that a relatively high resolution is to be used by the consumer circuitry for a region of the (decoded version of the) data array (e.g. where the data indicates that a region is to be displayed with a relatively high resolution), then a relatively high fidelity representation is generated for representing block(s) of the data array that correspond to (that are within) the indicated region, and where the data indicates that a relatively low resolution is to be used by the consumer circuitry for a region of the (decoded version of the) data array (e.g. where the data indicates that a region is to be displayed with a relatively low resolution), then a relatively low fidelity representation is generated for representing block(s) of the data array that correspond to (that are within) the indicated region.

In an embodiment, where the data indicates that the highest resolution is to be used by the consumer circuitry for a region of the (decoded version of the) data array (e.g. where the data indicates that a region is to be displayed with a highest resolution), then the highest fidelity, in an embodiment lossless, representation is generated for representing block(s) of the data array that correspond to (that are within) the indicated region. Correspondingly, where the data indicates that a lower resolution is to be used by the consumer circuitry for a region of the (decoded version of the) data array (e.g. where the data indicates that a region is to be displayed with a lower resolution), then a lower fidelity, in an embodiment lossy, representation is generated for representing block(s) of the data array that correspond to (that are within) the indicated region.

The manner in which each representation represents a block may be selected as desired.

In various embodiments, at least one of the plural (types of) representations comprises a tree representation. In an embodiment, the plural (types of) representation comprise plural different (types of) tree representations that differ in respect of their fidelity (lossiness), e.g. where each of the (types of) tree representations in an embodiment represents a block with a respective different degree of fidelity (lossiness). In embodiments, there is a highest fidelity, in an embodiment lossless, (type of) tree representation, and one or more lower fidelity, in an embodiment lossy, (types of) tree representations.

In embodiments, the highest fidelity representation comprises the tree representation described in US Patent Application No. 2013/0034309 (which is incorporated herein by reference), and one or more of the one or more lower fidelity tree representations may comprise a lossy version(s) of the tree representation described in US Patent Application No. 2013/0034309.

In these embodiments, one or more or each of the tree representations is in an embodiment configured such that the data values for the nodes of the tree are set such that the data value that the tree indicates for the data element of the data array that a leaf node of the tree represents is given by the sum of the data values in the tree for the leaf node and each preceding parent node in the branch of the tree that the leaf node belongs to.

In an embodiment, one or more or each tree is configured such that each leaf node of the tree represents a respective data element of the data array, and the data values for the nodes of the tree are in an embodiment set such that the data value that the tree indicates for the data element of the data array that a leaf node of the tree represents is given by the sum of the data values in the tree for the leaf node and each preceding parent node in the branch of the tree that the leaf node belongs to. Thus, to reproduce the data value for a data element that a leaf node of the tree represents, the value for the leaf node in the tree and the values for all the parent nodes in the tree along the branch in the tree that the leaf node resides on are in an embodiment added together.

In these embodiments, each tree can be generated in any suitable manner. Each node of the tree will in embodiments have plural child nodes, each representing a respective non-overlapping and equal-sized region of the region of the data array that the parent node represents, save for the end leaf nodes that represent the individual data elements themselves.

In embodiments, the tree representation(s) is in the form of a quadtree, i.e. a quadtree is generated to represent the data array block. However, other tree structures, i.e. having greater or fewer than four children per node could be used if desired. It would also be possible to use a hybrid tree structure, for example that is a quadtree but which only has two children per node for the next to lowest layer (i.e. the leaf node parent nodes only have two child leaf nodes each).

Where the tree representation comprises a quadtree, then each quadtree will accordingly have a root node representing the whole of the block of the data array that the quadtree is encoding. The root node will then have four child nodes (as it is a quadtree), each representing a respective non-overlapping and equal-sized region (and in an embodiment a quadrant) of the block of the data array that the root node (that the quadtree) represents. Each child node of the root node will then have four child nodes, each representing a respective non-overlapping and equal-sized region (and in an embodiment a quadrant) of the region of the data block that the child node of the root node (that the quadtree) represents, and so on (i.e. with each node having four child nodes, each representing a respective non-overlapping and equal-sized region of the block of the data array that the parent node represents), down to the leaf nodes that represent individual data elements (e.g. texels or pixels) of the data array.

Thus, for example, in the case of a quadtree for a 16×16 data element block, there will be a root node representing the whole 16×16 block. The root node will have four child nodes, each representing an 8×8 block of data elements within the 16×16 block. Each such child node will have four child nodes, each representing a 4×4 block of data elements with the 8×8 block in question, and so on, down to the leaf nodes that represent the individual data elements.

The (or each) tree, e.g. quadtree, may be generated such that each leaf node of the tree corresponds to a given data element (e.g. texel or pixel) of the data array block. Thus there will be one leaf node in the tree for each data element in the block of the data array that the tree is to represent.

Each node of the tree (e.g. quadtree) may have a respective data value associated with it. The data values for the nodes of the tree may be set such that the data value for the data element of the data array that a leaf node of the tree represents is given by the sum of the data values in the tree for the leaf node and of each preceding parent node in the branch of the tree that the leaf node belongs to. Thus, the data-value that is associated with and stored for each node of the tree may be (and is in an embodiment) the value that is needed to reproduce the desired leaf node values when all the node values along the branches of the tree are summed together in the appropriate fashion.

The data values to be associated with (set for) each node of the tree can be determined in any suitable manner. In embodiments, they are determined by performing two processing (data) passes.

In the first processing pass, each leaf node in the tree is initialised with (set to) the value that the tree is to indicate for the data element in the data array block to be encoded that the leaf node represents (corresponds to), and each non-leaf node is initialised with (set to) a selected value that is, e.g., based on the values of the leaf nodes in the tree. This calculation is in an embodiment performed from the bottom of the tree upwards.

The value that each non-leaf node is set to in this first processing (data) pass is in embodiments based and/or related to, the value of its child nodes. It is in embodiments determined in a predetermined manner from the values of its child nodes. In embodiments, each non-leaf node is initialised with (set to) the value of one of its child nodes. In various such embodiments, each non-leaf node is initialised with (set to) the minimum value of its child nodes (to the value of its lowest value child node) in this processing pass. In other embodiments, each non-leaf node is initialised with (set to) the maximum value of its child nodes (to the value of its highest value child node) in this processing pass.

The second (subsequent) processing pass in embodiments then subtracts from each node the value of its parent node. This is done for all nodes except the root node (which has no parent) and is again in embodiments done in a bottom-up fashion. The resulting node values following the second pass are then the values that are associated with (set for) each node in the tree.

In these embodiments, the fidelity (lossiness) of each of the plural (types of) tree representations can be controlled in any suitable manner.

In various embodiments, a lossy tree representation can be generated by truncating the tree. Thus, in various embodiments, one or more of the one or more lower fidelity tree representations may comprise a truncated tree representation, e.g. a truncated version of the tree representation described in US Patent Application No. 2013/0034309. This can have the effect of reducing the size of the tree, and can therefore reduce the number of bits required to encode the data array block (although it may be that the number of bits required to encode the truncated tree is the same as the number of bits required to encode the "original" non-truncated tree).

In these embodiments, instead of the tree comprising plural end leaf nodes that represent each (and every) element of the individual data elements of the data array block, the tree may be truncated by omitting from the tree (e.g. by removing from the tree) nodes that represent at least some or all of the individual data elements of the data array block (i.e. such that the tree does not include (other than includes) these nodes). It would also be possible to truncate the tree by omitting from the tree (e.g. by removing from the tree) one or more other, higher level, nodes from the tree (i.e. such that the tree does not include (other than includes) these nodes).

The truncation can be done at any level within the tree representation, and it would be possible to truncate all of the child nodes of a particular non-leaf node, or only truncate some but not all of the child nodes of a particular non-leaf node.

Thus, in embodiments one or more entire levels of the tree are truncated (e.g. one or more of the lowest levels of the tree may be truncated), and the tree representation in an embodiment omits the nodes of one or more entire levels of the tree. For example, the entire lowest level of the tree could be truncated by omitting from the tree (e.g. by removing from the tree) nodes that represent each of the individual data elements of the data array block.

Additionally or alternatively, only part of (some but not all nodes of) one or more of the levels of the tree may be truncated, i.e. such that the tree in an embodiment omits some but not all nodes of one or more of the levels of the tree. Thus, for example, part of the lowest level of the tree could be truncated by omitting from the tree (e.g. by removing from the tree) nodes that represent only some (but not all) of the individual data elements of the data array block. Only part of (some but not all nodes of) any of the other higher levels of the tree could also be truncated (omitted).

In these embodiments, any number of nodes may be omitted from the tree. In an embodiment, the tree is truncated by omitting from the tree (such that the tree omits) all the child nodes of an integer number of non-leaf nodes (at any suitable one or more levels of the tree). In this case, the child nodes of any suitable number of non-leaf nodes can be truncated (can be omitted from the tree). For example, in the case of a quadtree representation, the child nodes of one, two, three (or all four) of any one or more of the non-leaf nodes may be omitted from the tree (may be removed from the tree).

As such, in these embodiments, the truncated tree representation may comprise a root node representing the whole of the block of the data array that the tree is encoding. The root node will then have at least one child node (e.g. in the case of a quadtree representation either one, two, three or four child nodes), each representing a respective non-overlapping and equal-sized region (and in an embodiment a quadrant) of the block of the data array that the root node (that the quadtree) represents.

Each child node of the root node may then have its own number of child nodes, e.g. zero child nodes or at least one child node (e.g. in the case of a quadtree representation either one, two, three or four child nodes), each representing a respective non-overlapping and equal-sized region (and in an embodiment a quadrant) of the region of the data block that the child node of the root node (that the quadtree) represents, and so on (i.e. with each node having zero or at least one child node (e.g. in the case of a quadtree representation either one, two, three or four child nodes child nodes), each representing a respective non-overlapping and equal-sized region of the block of the data array that the parent node represents).

Each truncated tree representation may be generated in any suitable manner (e.g. in a corresponding manner to that described above). In various embodiments, the "minimum-value" tree representation may be generated in the manner described above, and then one or more or all of the nodes of the tree may be suitably discarded in order to obtain the truncated tree representation.

Other arrangements would be possible.

In various embodiments, a lossy tree representation can be generated by including in the tree an indication that one or more sub-regions of the data array block that the tree representation represents is a copy of one or more other sub-regions of the data array.

Thus, for example, for each of one or more particular non-leaf nodes in the tree representation, in addition to or instead of including in the tree a respective (e.g. minimum) data value for the particular node (as described above), the tree representation may include an indication associated with the particular node, where the indication indicates (to the decoder) that the particular non-leaf node (and in an embodiment its child nodes) should be treated as being a copy of another non-leaf node (and in an embodiment its child nodes).

In this case, the child nodes of the particular non-leaf node could be truncated from (omitted from) the tree, e.g. in the manner described above. This would according have the effect of reducing the size of the tree, and would therefore reduce the number of bits required to encode the data array block.

Thus, the lossy tree representation may comprise, in respect of one or more non-leaf nodes of the tree representation, an indication associated with the non-leaf node that indicates (to the decoder) that the non-leaf node (and in an embodiment its child nodes) is a copy of another non-leaf node (and in an embodiment its child nodes).

In various embodiments, instead (or in addition to) truncating (omitting nodes from) the tree representation in the manner described above, the values of at least some of the "minimum" data values that are associated with each node (as described above), can be modified in a manner that reduces the number of bits required to encode the values. Thus, in various embodiments, one or more of the one or more lower fidelity tree representations may comprise a modified tree representation. This may be done, for example, by reducing at least some of the minimum data values. Reducing the values of at least some of the minimum data values that are associated with each node allows the "minimum tree" to be compressed to a greater degree, i.e. so that the number of bits required to represent the tree representation can be reduced.

In these embodiments, the data values that are associated with each node, can be modified or reduced in any suitable manner.

For example, one or more or each of the minimum data values could be reduced by a set, e.g. pre-defined, amount, e.g. by subtracting the set amount from one or more or each of the minimum data values.

Additionally or alternatively, one or more or each of the minimum data values could be reduced by dividing the value by a set, e.g. pre-defined, amount, e.g. by dividing one or more or each of the minimum data values by the set amount. One or more or each minimum value could, for example, be halved, quartered, etc.

In various further embodiments, one or more or each of the minimum data values could be set to zero.

In these embodiments, the modification can be done at any level within the tree representation, and it would be possible to modify all of the child nodes of a particular non-leaf node, or only modify some but not all of the child nodes of a particular non-leaf node.

In embodiments the values of the nodes of one or more entire levels of the tree are modified, e.g. the values of the nodes of one or more of the lowest levels of the tree may be modified (reduced). For example, the values for the nodes of the entire lowest level of the tree could be modified (reduced).

Additionally or alternatively, the values of the nodes of only part of one or more of the levels of the tree may be modified (reduced). Thus, for example, values of the nodes of only part (some but not all nodes) of the lowest level of the tree could be modified (reduced). The values of only part (some but not all nodes) of any of the other higher levels of the tree could also be modified (reduced).

In these embodiments, the values associated with any number of nodes may be modified (reduced). In an embodiment, the modified tree representation is generated by modifying (reducing) the values associated with all of the child nodes of an integer number of non-leaf nodes (at any suitable one or more levels of the tree). In this case, the values of child nodes of any suitable number of non-leaf nodes can be modified (reduced). For example, in the case of a quadtree representation, the values of child nodes of one, two, three (or all four) of any one or more of the non-leaf nodes may be modified (reduced).

In these embodiments, each modified tree representation may be generated in any suitable manner (e.g. in a corresponding manner to that described above). In various embodiments, the "minimum-value" tree representation may be generated in the manner described above, and then one or more or all of the values of the nodes of the tree may be suitably modified or reduced in order to obtain the modified tree representation. Thus, for example, one or more or all of the minimum data values determined in the second processing pass may be modified or reduced.

Thus, in various embodiments, in the second (subsequent) processing pass, after subtracting from each node the value of its parent node, one or more or each of the resulting values may then be modified or reduced, and the so-modified node value(s) may then be the value(s) that is associated with (set for) each node in the tree.

In these embodiments, where the child nodes of a particular non-leaf node are modified (e.g. reduce or zeroed), the data value that is included in the tree for the particular non-leaf node may be the minimum data value that is determined in the second processing pass. An improvement to this would be to instead set the data value for the particular non-leaf node to be the average of the originally determined minimum data values of the child nodes. This would increase the fidelity of the block, without (significantly) increasing the number of bits required to represent it.

Thus, in various embodiments, when generating the tree representation, one or more or each non-leaf node may be set to the average value of its child nodes (and in an embodiment one or more or each of the child nodes may be set to zero). Correspondingly, the encoding circuitry may be configured to generate the lossy tree representation by setting one or more non-leaf node in the tree to the average value of its child nodes.

In various further embodiments, where the tree representation is a lossy tree representation, the value that the tree is to indicate for the data element in the data array to be encoded that the leaf node represents (corresponds to) may comprise a modified or approximated version of the original (actual) (as-generated) value of the data element in the data array to be encoded that the leaf node represents (corresponds to).

Thus, while the value that the tree is to indicate for a data element in the data array block, i.e. that the corresponding leaf node will be set to in the first data pass, may be the actual value of that data element in the data array for a lossless representation of the original data array block, where the tree is to be a lossy representation of the data array block, the value that the tree is to indicate for a data element in the data array block, i.e. that the corresponding leaf node will be set to in the first data pass, may be an approximation to the actual value.

In these embodiments, one or more or each data element value can be modified (approximated) in any suitable manner.

In various embodiments, prior to the first processing pass, the block may be subjected to filtering. For example, the block may be low-pass filtered, e.g. so as to remove higher frequency components. This may have the effect of reducing the difference values, so as to thereby increase the compression in the manner described above, but also to reduce "blocky" artefacts, and to thereby provide an improved "smoother" result.

Any suitable filtering technique may be used. In various embodiments, each block or sub-block of the data array may be subjected to a frequency domain transformation such as a discrete cosine transformation (DCT), high frequency components may be attenuated (removed), and then the data may be transformed back into the spatial domain (before being encoded as above). Alternatively, direct spatial filtering may be used.

Although as described above, in various embodiments, one or more of the plural (types of) representations comprise a tree representation, it would also be possible for one or more of the plural (lower fidelity) (types of) representations to comprise other (types of) representation.

For example, in various embodiments, one or more or each block may be represented by a constant (single) value (e.g. a constant (single) colour). That is, the representation for representing a block may comprise a constant (single) value.

Thus, one or more of the plurality of (lower fidelity) representations may comprise a representation for representing a block in which a single data value represents plural data elements of the block. In an embodiment the single data value represents the data elements of the entire block.

The single value that is used in these embodiments may be selected as desired. For example, the single value may comprise a default (e.g. pre-determined) value. Additionally or alternatively the single value may comprise an average value, e.g. an average of all the data elements in the block or sub-block in question. Thus, the encoding circuitry may generate a representation for representing a block by generating an average value of the data elements of the block or of one or more sub-regions of the block.

Other arrangements would be possible.

Once the (tree) representation, such as the quadtree, representing the data array has been generated, it is then necessary to generate data representing the (tree) representation, which data is may then be stored as the encoded version of the original data array. The generated and stored data representing the (tree) representation can take any suitable and desired form. However, in an embodiment it represents the (tree) representation in an encoded form. In an embodiment the data representing the (tree) representation (that is generated and stored to represent the (tree) representation) is a compressed representation of the (tree) representation that represents the data array (or part of the data array).

In embodiments where the representation comprises a tree representation, the generated and stored data representing the tree, as well as including a set of data indicating the tree node values, as discussed above, may also include a set of data to be used when (and for) identifying the data for each respective tree node in the set of data indicating the tree node values (e.g., a bit count tree). This set of node value identifying data can then be used by a decoder for identifying the data for a given tree node within the stored set of data representing the tree node values.

The compression of the (tree) representation, and the bit count tree, are described in more detail in US Patent Application No. 2013/003430, which is incorporated herein by reference.

The techniques of various embodiments can be used in conjunction with various variable resolution techniques. One exemplary technique that may be improved using the techniques of the technology described herein is so-called "foveated" or "variable resolution" rendering (also known as "lens-matched" rendering).

Variable resolution ("foveated") rendering is a rendering technique where one or more parts of a frame (image) to be displayed are rendered at a higher resolution, but one or more other parts of the frame are rendered at a lower resolution.

This may be used, for example, for a so called "XR" display, such as an augmented reality (AR) and/or virtual reality (VR), head mounted display (HMD) system. In these embodiments, the data processing system may operate to track the movement of the head/gaze of the user (so called head pose tracking). This head orientation (pose) data may then be used to determine how the images should actually be displayed to the user for their current head position (view direction), and the images (frames) may be rendered accordingly (for example by setting the camera (view point) orientation based on the head orientation data), so that an appropriate image based on the user's current direction of view can be displayed.

Variable resolution ("foveated") rendering recognises that the area of the frame that the user is looking at directly may need to be displayed at a higher resolution for visual acceptability, while the peripheral area of the frame that the user is not directly looking at can be displayed at a lower resolution whilst still appearing visually acceptable. This can then be used to reduce the processing burden on the data processing system by displaying the peripheral area at a lower resolution, rather than displaying the entire frame at the highest required ("foveal") resolution.

Variable resolution rendering may be carried out by identifying one or more "fixation points" where higher resolution areas of the frame will be displayed, with the areas further away from the fixation point(s) being displayed with a lower resolution. Thus, each fixation point may indicate the highest resolution area of the frame and, in some cases, may correspond to the centre of the eye's retina (the fovea).

When performing variable resolution rendering, the locations of the highest resolution areas of the frame (e.g. the fixation point(s)) may be determined in any suitable and desired manner. For example, some form of head tracking or eye tracking (head pose tracking) may be used to try to identify where the user is looking at the image, so as to identify the area of the frame that should be displayed with the highest resolution. The location of higher resolution areas of the frame may also or instead be based on other factors, such as lens distortion.

According to various embodiments, variable resolution rendering may be performed by the producer processing unit generating, for a frame to be displayed, a single, e.g. full or high, resolution version of the frame to be displayed, and the encoding process may be used to, in effect, alter the resolution of one or more regions of the frame so as to generate an output frame for which different regions of the frame have different resolutions.

Thus, according to various embodiments, the producer circuitry is configured to generate (and the method comprises generating), for a frame to be displayed, a single (e.g. full or high resolution) version of the frame to be displayed.

The frame may then be encoded by encoding circuitry. The encoding circuitry in an embodiment uses the resolution indicating information to control the generation of the tree representation for at least one block that the frame is divided into. According to various embodiments, this is done such that the encoded version of the frame is encoded with a variable resolution, i.e. so that different regions of the frame have different resolutions.

This allows foveated (variable resolution) frames for display for use, for example, in augmented or virtual reality display systems, to be generated in a particularly efficient and effective manner, and can provide, for example, savings in terms of memory bandwidth, etc. when compared with other foveated (variable resolution) rendering techniques.

In these embodiments, the highest resolution region of the frame may comprise the "foveal" view that is to be displayed at the fixation position where the highest resolution of the frame is to be displayed. The one or more lower resolution regions of the frame may be, and are in an embodiment, used and displayed away from the fixation point, e.g. towards the periphery of the output frame that is being displayed.

In these embodiments, the determination of which representation is to be used for any given position in the overall output array (frame) can be performed as desired. In the case of foveated rendering, appropriate head tracking or eye tracking information could be used to identify which resolution should be displayed where in the output array (frame), and/or information relating to the properties of the display system could be used as well or instead. For example, in the case of head-mounted displays, the centre of the output array (frame) could be identified and indicated as the region where the highest resolution version should be displayed, with regions towards the periphery of the output array (frame) then being displayed at lower resolutions.

Other arrangements would be possible.

Although the technology described herein has been described above with particular reference to the generation and processing of a single array (frame), as will be appreciated by those skilled in the art, the operation in the manner of the technology described herein is in an embodiment performed for plural arrays (frames), e.g. that are to be displayed, and in an embodiment for each array (frame) of a sequence of plural arrays (frames), e.g. that is to be displayed. Thus, in an embodiment, the operation in the manner of the technology described herein is used to generate a sequence of plural output arrays (frames for display to a user), and correspondingly, the operation in the manner of the technology described herein is in an embodiment repeated for plural output arrays (frames to be displayed).

Thus, for example, a producer processing unit will produce a sequence of plural output arrays (frames to be displayed), with the display processor then processing those arrays (frames) appropriately to provide them to the display for display.

The display in the technology described herein can be any suitable and desired form of display, and can comprise any suitable and desired components and elements that a display may comprise, such as, and in an embodiment, a display panel, a display driver circuit for scanning frame data to the display panel, and a display receiver for receiving data to be displayed on the display panel. The display may also comprise appropriate local (on chip) frame data storage, such as a frame buffer. The display may comprise the overall data processing system's (device's) local display (screen) and/or an external display. There may be more than one display output, if desired.

In an embodiment, the display comprises a head mounted display, e.g., and in an embodiment, for virtual reality and/or augmented reality display. In this case, the display should, and in an embodiment does, accordingly comprise a display panel for displaying the frames to the user, and a lens or lenses through which the user will view the displayed frames.

Correspondingly, in an embodiment, the display has associated view orientation determining (e.g. head tracking) sensors, which, in an embodiment periodically, generate view tracking information based on the current and/or relative position of the display, and are operable to provide that view orientation periodically to processing units of the data processing system.

Thus, another embodiment of the technology described herein comprises a head mounted display device comprising the data processing system of any one or more of the embodiments of the technology described herein. Correspondingly, another embodiment of the technology described herein comprises a method of operating a head mounted display device, comprising operating a head mounted display device in the manner of any one or more of the embodiments of the technology described herein.

As well as the particular units and components required for operation in the manner of the technology described herein, the data processing system may, and in an embodiment does, also comprise one or more of, and in an embodiment all of, any other suitable and desired component, unit, processor, etc., that a data processing system may comprise. Thus the data processing system may comprise one or more of, and in an embodiment all of: a central processing unit, a host processor, a graphics processing unit, a video processor, an image signal processor, a camera, a system bus, and a memory controller. In an embodiment, the data processing system comprises and/or is in communication with, one or more memories and/or memory devices that store data described herein, and/or software for performing the processes described herein.

The methods and apparatus of the technology described herein can be implemented in any appropriate manner, e.g. in hardware or software, and in (and be included in) any appropriate device or component.

The actual device or component which is used to store the data in the manner of the technology described herein will, for example, depend upon the nature of the data array that is being stored. Thus, for example, in the case of a graphics texture, an appropriate processor, such as a personal computer, may be used to generate and store the textures in the manner of the technology described herein, e.g. by an application developer, and the so stored textures then provided as part of the content of a game, for example. In the case of the stored data array being a frame for display, then it may accordingly be a graphics processor that generates and stores the data in the manner required.

Similarly, on the data reading (decoding) side of the operation, in the case of texture data, for example, it could be a graphics processor that reads (decodes) the stored data array, and in the case of a frame for display, it could be a display controller for a display that reads (decodes) the stored data array.

In an embodiment the technology described herein is implemented in a graphics processor, a display controller, an image signal processor, a video decoder or a video encoder, and thus the technology described herein also extends to a graphics processor, a display controller, an image signal processor, a video decoder or a video encoder configured to use the methods of the technology described herein, or that includes the apparatus of the technology described herein, or that is operated in accordance with the method of any one or more of the embodiments of the technology described herein. Subject to any hardware necessary to carry out the specific functions discussed above, such a graphics processor, display controller, image signal processor, video decoder or video encoder can otherwise include any one or more or all of the usual functional units, etc., that graphics processors, display controllers, image signal processors, video decoders or video encoders include. In an embodiment, the methods and apparatus of the technology described herein are implemented in hardware, in an embodiment on a single semiconductor platform.

The technology described herein is particularly, but not exclusively, suitable for use in low power and portable devices. Thus, in an embodiment, the technology described herein is implemented in a portable device, such as a mobile telephone or PDA.

Similarly, the memory where the data representing the tree representing the data array is stored may comprise any suitable such memory and may be configured in any suitable and desired manner. For example, it may be an on chip buffer or it may be an external memory (and, indeed, may be more likely to be an external memory). Similarly, it may be dedicated memory for this purpose or it may be part of a memory that is used for other data as well. In an embodiment, this data is stored in main memory of the system that incorporates the graphics processor.

In the case of a texture data array, the memory is in an embodiment a texture buffer of the graphics processing system (which buffer may, e.g., be on chip, or in external memory, as desired). Similarly, in the case of a frame for the display, the memory is in an embodiment a frame buffer for the graphics processing system and/or for the display that the graphics processing system's output is to be provided to.

All the data representing the tree representing the data array is in an embodiment stored in the same physical memory, although this is not essential.

Other memory arrangements would, of course, be possible.

The technology described herein can be implemented in any suitable system, such as a suitably configured microprocessor based system. In an embodiment, the technology described herein is implemented in computer and/or microprocessor based system.

The various functions of the technology described herein can be carried out in any desired and suitable manner. For example, the functions of the technology described herein can be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages and engines of the technology described herein may be embodied as processing stage circuitry (circuits), e.g., in the form of one or more fixed-function units (hardware) (processing circuitry (circuits)), and/or in the form of programmable processing circuitry (circuits) that can be programmed to perform the desired operation. Equally, any one or more of the processing stages and processing stage circuitry of the technology described herein may be provided as a separate circuit element to any one or more of the other processing stages or processing stage circuitry (circuits), and/or any one or more or all of the processing stages and processing stage circuitry (circuits) may be at least partially formed of shared processing circuitry.

It will also be appreciated by those skilled in the art that all of the described embodiments of the technology described herein can include, as appropriate, any one or more or all of the optional features of the technology described herein.

The methods in accordance with the technology described herein may be implemented at least partially using software e.g. computer programs. It will thus be seen that embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk.

It will further be appreciated that not all steps of the methods of the technology described herein need be carried out by computer software and thus further broad embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

FIG. 1 shows schematically an exemplary data array 30 that may be encoded in the manner of the technology described herein. The array of data 30 is a two dimensional data array containing a plurality of data elements (i.e. containing data array entries at a plurality of particular positions within the array). The data array 30 could be any suitable and desired array of data, such as data representing an image.

In a graphics processing context, the data array could, for example, be a texture map (i.e. an array of texture elements (texels)), or an array of data representing a frame to be displayed (in which case the data array may be an array of pixels to be displayed). In the case of a texture map, each data entry (position) in the data array will represent an appropriate texel value (e.g. a set of colour values, such as RGBA, or luminance and chrominance, values for the texel). In the case of a frame for display, each data entry (position) in the array will indicate a set of colour values (e.g. RGB values) to be used for displaying the frame on a display.

In the technology described herein, the data array 30 is encoded and compressed to provide a set of data representing the data array 30 that can then be stored in memory, and from which set of data, the data values of individual data elements in the data array 30 can be derived by decoding the data representing the data array 30.

An embodiment of the process for encoding and compressing the data array 30 will now be described.

In this embodiment, as shown in FIG. 1, to encode and compress the data array 30, the data array 30 is first divided into a plurality of non-overlapping, equal size and uniform blocks 31, each block corresponding to a particular region of the data array 30. In the present embodiment, each block 31 of the data array corresponds to a block of 16×16 elements (positions) within the data array 30 (i.e. a block of 16×16 texels in the case of a texture map). (Other arrangements would, of course, be possible.)

Each such block 31 of the data array 30 is then encoded to provide a compressed representation of the block 32 of the data array 30.

To do this, a particular form of quadtree representation representing the block 31 of the data array 30 is first generated. This is done as follows.

The quadtree is constructed to have a root node that represents the whole of the data block 31 (thus the whole 16×16 block in the present embodiment). That root node then has four child nodes, each representing a respective non-overlapping, uniform and equal size 8×8 sub block 32 of the 16×16 block 31 of the data array 30. Each such 8×8 sub block representing child node then itself has four child nodes, each representing a respective non-overlapping, uniform and equal size 4×4 sub block 33 of the 8×8 sub block 32, and so on, down to the 16 leaf nodes of the quadtree that will each represent respective individual data elements of the 16×16 block 31 of the data array 30.

The data value for each node of the quadtree is determined by performing two processing (data) passes.

In the first processing pass in this embodiment, each leaf node of the quadtree is initialised with (set to) the value of the data element of the block 31 of the data array 30 that the leaf node corresponds to. Each non-leaf node is then initialised with (set to) the minimum value of its child nodes (to the value of its lowest value child node). This calculation is performed from the bottom up.

A second processing pass is then performed, in which each node except the root node (which has no parent) has the value of its parent node subtracted from it. This is again done from the bottom up.

The node values following this second processing pass are then the node values to be used for each node of the quadtree representing the block 31 of the data array 30.

The effect of this process is that the value of the data element in the data array that a leaf node represents will be given by the sum of the value for the leaf node and of the values all the preceding nodes along the branch of the quadtree that the leaf node resides on (in other words, to determine the value of a data element that a leaf node of the quadtree represents from the quadtree representation of the data array, the value for the leaf node and of the values all the preceding nodes along the branch of the quadtree that the leaf node resides on must be summed (added together)).

Figure 2:
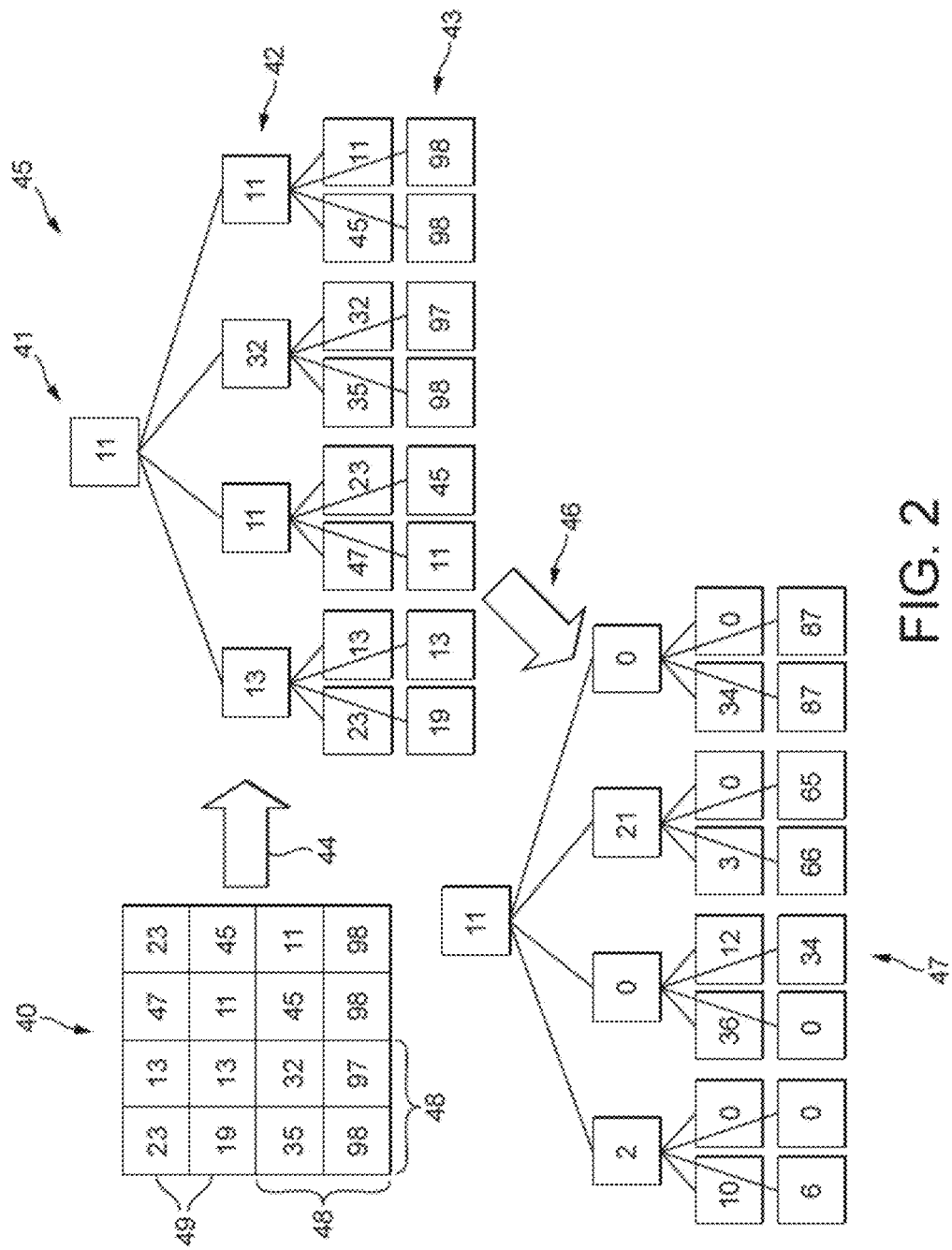
FIG. 2 shows schematically the generation of a quadtree representing an array of data elements in accordance with embodiments of the technology described herein.

FIG. 2 illustrates the construction of such a quadtree for a representative 4×4 block 40 of data elements.

As shown in FIG. 2, the quadtree 45 representing the 4×4 array of data elements 40 has a root node 41, which has four child nodes 42, each corresponding to a respective 2×2 block 48 of the 4×4 block 40 of data elements. Each such child node 42 of the quadtree 45 then has 4 child nodes which form the leaf nodes 43 of the quadtree 45. The leaf nodes 43 of the quadtree 45 each correspond to a respective individual data element 49 of the 4×4 block 40 of data elements.

As shown in FIG. 2, and as discussed above, in a first processing pass 44 each of the leaf nodes 43 in the quadtree 45 is set to the value of its respective data element 49 in the block of data elements 40 (i.e. to the value of the data element 49 that the leaf node 43 corresponds to), and each non-leaf node 41, 42 in the tree 45 representing the data array 40 is set to the minimum value of its child nodes. This calculation is performed from the bottom up.

Then, in a second processing pass 46, each node, except the root node 41 (which has no parent) has the value of its parent node subtracted from it. This is again done from the bottom up.

The resulting node values 47 following this second processing pass are the node values for the tree representing the data array 40 that are stored to represent the data array 40.

In the present embodiment, a separate such quadtree representation is constructed for each different component (data channel) of the data elements of the data array that is being encoded. Thus, for example, in the case where each data element has four components, such as RGBA colour components, a separate quadtree representation of the form described above is constructed for each colour component, i.e. such that there will be a "red" component quadtree, a "green" component quadtree, a "blue" component quadtree, and an "alpha" component quadtree.

Once the difference values to be stored for each node of the quadtree representing the block 30 of the data array have been determined in the above manner, a set of data representing that "difference value" quadtree is then generated using an entropy coding scheme.

The entropy coding process used in the present embodiment basically determines how many bits are to be used to signal the respective difference values for the quadtree representing the data array. Once this has been done, a set of data representing the quadtree representing the block of the data array that uses the determined number of bits to signal the respective difference values is generated and stored to represent the node values of the quadtree representing the block of the data array.

Furthermore, to facilitate decoding of that stored data representing the node values of the quadtree, a set of data indicating the number of bits that have been used to signal the respective difference values, which is also in the form of a quadtree, is also generated and stored.

Thus the coding and storage of the data representing the difference values for the nodes of the quadtree representing the block of the data array is based on a quadtree that is maintained in parallel with the tree representing the values of the data array, which quadtree represents (and allows to be derived) the number of bits that have been used to signal the differences for the children of a node of the quadtree representing the values of the data elements of the relevant block of the data array (and thus this parallel tree can accordingly be considered as a "bit count" tree).

This process is described in more detail in US 2013/0034309, which is incorporated herein by reference.

In operation to encode a data array 30 in the manner of the present embodiment, the data for the data array can be processed in any suitable and desired manner. For example, a suitable processor or processing circuitry may read the original data array to be compressed from memory, and/or receive a stream of data corresponding to the original data array to be compressed, and then process the stream of data accordingly, e.g. divide it into blocks, generate the necessary quadtrees, and then generate data representing the quadtree (s) and store that tree-representing data in memory, e.g. in memory and/or on a removable storage medium, etc.

As discussed above, in the present embodiment, this process will accordingly first comprise generating for the data array, or for each block that the data array has been divided into, a "minimum value" quadtree having the form described above, in which the leaf nodes of the tree correspond to respective data elements of the data array (or block of the data array). Then a bit count quadtree is derived, based on the number of bits that are needed to indicate, and that will be used to indicate, the value of each node of the minimum value quadtree in a set of data representing the node values of that minimum value quadtree. A set of data representing that bit count quadtree will then be generated, together with a set of data representing the node values of the minimum value quadtree (in the form of difference values), which set of node value indicating data is configured according to, and has the configuration indicated by, the corresponding bit count quadtree.

The so generated set of data representing the tree node values and the set of data representing the corresponding bit count tree will then be stored appropriately for use as a compressed set of data representing the data array.

The above primarily describes the way in the present embodiment that the encoded version of the data array is generated and stored in memory for use. When the so-stored data array comes to be used, for example to apply to fragments to be rendered (where the stored data array is a texture map for use in graphics processing), then the decoding process will essentially comprise the reverse of the above encoding process described above.

Thus, the decoding device, such as a graphics processor (e.g. where the stored data array is texture map) or a display controller (e.g., where the stored data array is a frame to be displayed), will read the relevant sub-block data from the appropriate location in memory, and decode that data to determine the value of the data element or elements of interest.

The decoder will first determine the required bit count tree node values from the stored data representing the bit count tree, and then use those determined bit count tree node values to identify the data for the relevant nodes of the quadtree representing the values of the data elements of the block of the data array of interest, and use those node values to determine the value of the data element or elements of interest.

As part of this process, the decoder will, accordingly, look at the bit count node values, and interpret the stored data representing the quadtree representing the values of the data elements of the data block, and determine the values for the nodes of that quadtree, accordingly.

This process can then be repeated for each data element of interest (whose value is required).

Figure 3:
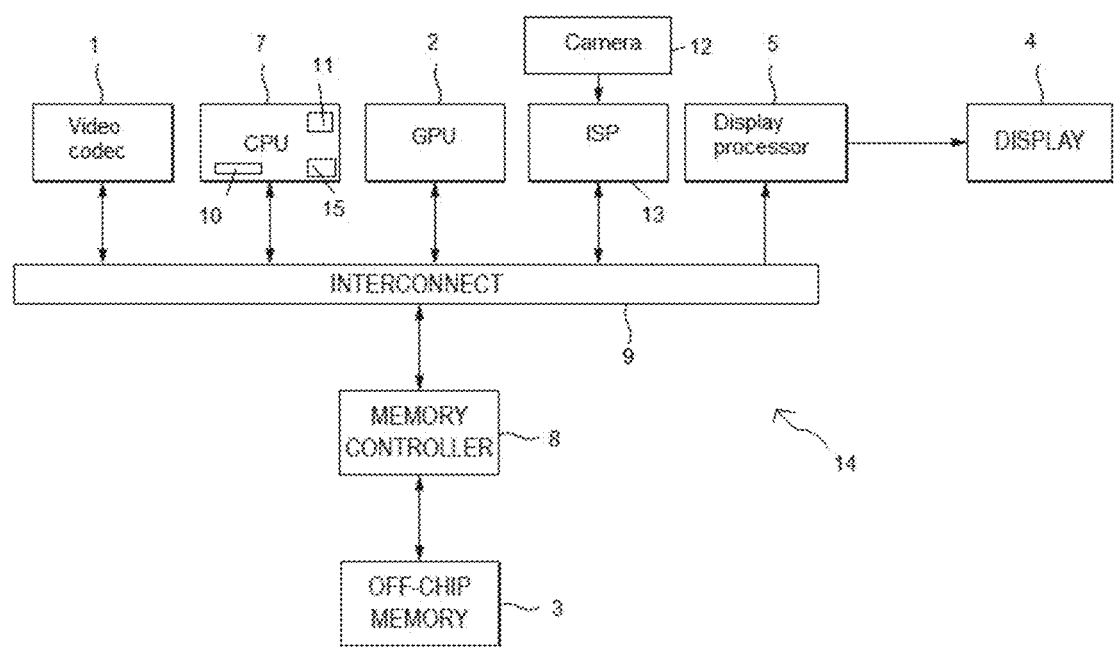
FIG. 3 shows schematically a data processing system that may use data arrays encoded in accordance with the technology described herein.

FIG. 3 shows schematically an arrangement of a data processing system 14 that can store and use data arrays that have been stored in the manner of the technology described herein.

The data processing system 14 of FIG. 3 comprises a host processor comprising a central processing unit (CPU) 7, a graphics processing unit (GPU) 2, a video codec 1, an image signal processor (ISP) 13 (that is, e.g., in communication with a camera 12), a display processor (display processing unit (DPU)) 5, and a memory controller 8. As shown in FIG. 3 these units communicate via an interconnect 9 and have access to off chip memory 3.

In this system the GPU 2, video codec 1, ISP 13 and/or CPU 7 will generate frames (images) to be displayed and the display processor 5 will then provide the frames to a display 4 for display. The display 4 may be local or remote to the remainder of the system, and may have a wired or wireless connection to the display processor 5.

In use of this system, an application such as game executing on the host processor (CPU) will, for example, require the display of frames on the display 4. To do this, the application 10 will submit appropriate commands and data to a driver 11 for the graphics processing unit 2 that is executing on the CPU 7. The driver 11 will then generate appropriate commands and data to cause the graphics processing unit 2 to render appropriate frames for display and to store those frames in appropriate frame buffers, e.g. in the main memory 3. The display processor 5 will then read those frames into a buffer for the display from where they are then read out and displayed on the display panel of the display 4.

The frames for display may also or instead be streamed to the display processor from the processing unit, e.g. the GPU 2 or ISP 13, that is producing the frames, e.g. through a cache, if desired.

The data processing system 14 illustrated in FIG. 3 may be used to provide frames for display to a so called "XR" display, such as an augmented reality (AR) and/or virtual reality (VR), head mounted display (HMD) system. In this case, the display 4 of the system may comprise an appropriate head-mounted display that includes, inter alia, a display screen or screens (panel or panels) for displaying frames to be viewed to a user wearing the head-mounted display, one or more lenses in the viewing path between the user's eyes and the display screens, and one or more sensors for tracking the pose of the user's head (their head position and/or their view (gaze) direction) in use (while images are being displayed on the display to the user).

In a head mounted AR/VR display operation, the appropriate images to be displayed to each eye will, e.g., be rendered by the graphics processing unit 2, in response to appropriate commands and data from the application, such as a game, (e.g. executing on the CPU 7) that requires the augmented reality or virtual reality display.

In such arrangements, the system will also operate to track the movement of the head/gaze of the user (so called head pose tracking). This head orientation (pose) data is then used to determine how the images should actually be displayed to the user for their current head position (view direction), and the images (frames) are rendered accordingly (for example by setting the camera (view point) orientation based on the head orientation data), so that an appropriate image based on the user's current direction of view can be displayed.

A technique that is used to help facilitate the generation of frames for display at an appropriate rate in "XR" display systems is so-called "foveated" or "variable resolution" rendering.

Variable resolution ("foveated") rendering is a rendering technique where one or more parts of a frame (image) to be displayed are rendered at a higher resolution, but one or more other parts of the frame are rendered at a lower resolution.

This is based on the fact that the area of the frame that the user is looking at directly may need to be rendered at a higher resolution for visual acceptability, while the peripheral area of the frame that the user is not directly looking at can be rendered at a lower resolution whilst still appearing visually acceptable. This can then be used to reduce the rendering burden on the, e.g. graphics processing unit (GPU), that is producing the frames for display, by rendering the peripheral area at a lower resolution, rather than rendering the entire frame being displayed at the highest required ("foveal") resolution.

Variable resolution rendering may be carried out by identifying one or more "fixation points" where higher resolution areas of the frame will be rendered, with the areas further away from the fixation point(s) being rendered with a lower resolution. Thus, each fixation point may indicate the highest resolution area of the frame and, in some cases, is intended to correspond to the centre of the eye's retina (the fovea).

Variable resolution rendering can also be used to take account of (and exploit) lens distortions introduced by head-mounted displays (HMDs)). High resolution head-mounted displays, e.g. for virtual reality applications, typically use lenses that feature severe pin-cushion distortion. This pin-cushion distortion can be corrected by passing the rendered image through a barrel distortion. The effect of this is that the rendered image towards the centre of the display (for each eye) is magnified whereas the peripheral area is minified. The effect of this then is that the peripheral area can be rendered at a lower quality than the central, magnified area, without any significant loss in the overall visual effect for the user.

When performing variable resolution rendering, the locations of the highest resolution areas of the frame (e.g. the fixation point(s)) may be determined in any suitable and desired manner. For example, some form of head tracking or eye tracking (head pose tracking) may be used to try to identify where the user is looking at the image, so as to identify the area of the frame that should be rendered with the highest resolution. The location of higher resolution areas of the frame may also or instead be based on other factors, such as lens distortion.

Various embodiments relate to performing the encoding technique described above (and described in US Patent Application No. 2013/0034309) to encode arrays of data 30 such as frames for display, in a lossy manner but in a way that is transparent to the decoder, e.g. so that the only modifications relative to US Patent Application No. 2013/0034309 are on the encoding side, and so that the decoder can operate in the normal manner.

This may be particularly useful and applicable to situations such as foveated rendering, where lower resolution (i.e. lossy) regions of an overall frame 30 are acceptable, and the location of those regions can be known in advance (and so that information can be provided to the encoder). The encoder can then use information about the foveated regions to modify how it encodes each of the blocks 31. This works because in the above-described encoding technique each block or "superblock" 31 is encoded independently, and so can be treated differently to any other superblocks making up the overall frame 30.

This allows foveated rendering to be implemented by generating a frame 30 at a relatively high resolution, and then encoding higher resolution regions of the frame 30 (such as "fixation points") using lossless encoding, and encoding lower resolution regions of the frame (further away from the fixation point(s)) using lossy encoding. Thus, the bandwidth associated with a variable resolution image can be reduced by truncating the compression locally.

This allows the encoder to produce encoded images with less bandwidth, where data is intentionally discarded data during the encoding step. This can provide a lossy bandwidth saving for foveated rendering where the periphery of the image can be stored as a reduced effective resolution. These encoded images are compressed in a manner that allows them to be decoded by existing decoders.

Thus, in various embodiments a lossy version of the above-described encoding technique is performed for foveated rendering. The lossy encoding technique can be used to reduce bandwidth in foveated rendering.

The lossy encoding may also be performed for other variable resolution techniques. For example, in video decoding it may be known that the end result of a decoding process will be displayed as a thumbnail. In this case, data could be discarded during encoding (as described above), knowing that the results would still be acceptable.

In the context of lens-matched foveated rendering, there will be prior knowledge of what pixel density is desired across the image. This density should be provided to the encoder, e.g. during rendering at superblock granularity, although other arrangements to this are possible.

Thus, in various embodiments when encoding a frame using, for example, foveated rendering or other variable resolution techniques, the encoder is provided with information (e.g. a "density map") indicating the required resolution across the frame (in different regions of the frame), and then will tailor its encoding of blocks (or sets of blocks) across the frame using the provided "density map" to determine whether to encode regions of the frame in a lossy or non lossy manner.

Thus, the encoder will receive the image data (the frame) to be encoded, together with a description of how lossily to compress different regions of the image (frame). The lossily compression description could, for example, be in the form of a 2D map telling the encoder what compression to use where, and may be predefined, e.g. based on knowledge of the head-mounted display that is being used.

In this embodiment, the 2D map may be in the form of a two-dimensional array representing the (area of the) output frame to be displayed, with respective data element positions within the array then indicating which resolution version of the frame to use for a given region (block/tile) within the output frame.

Figure 4:
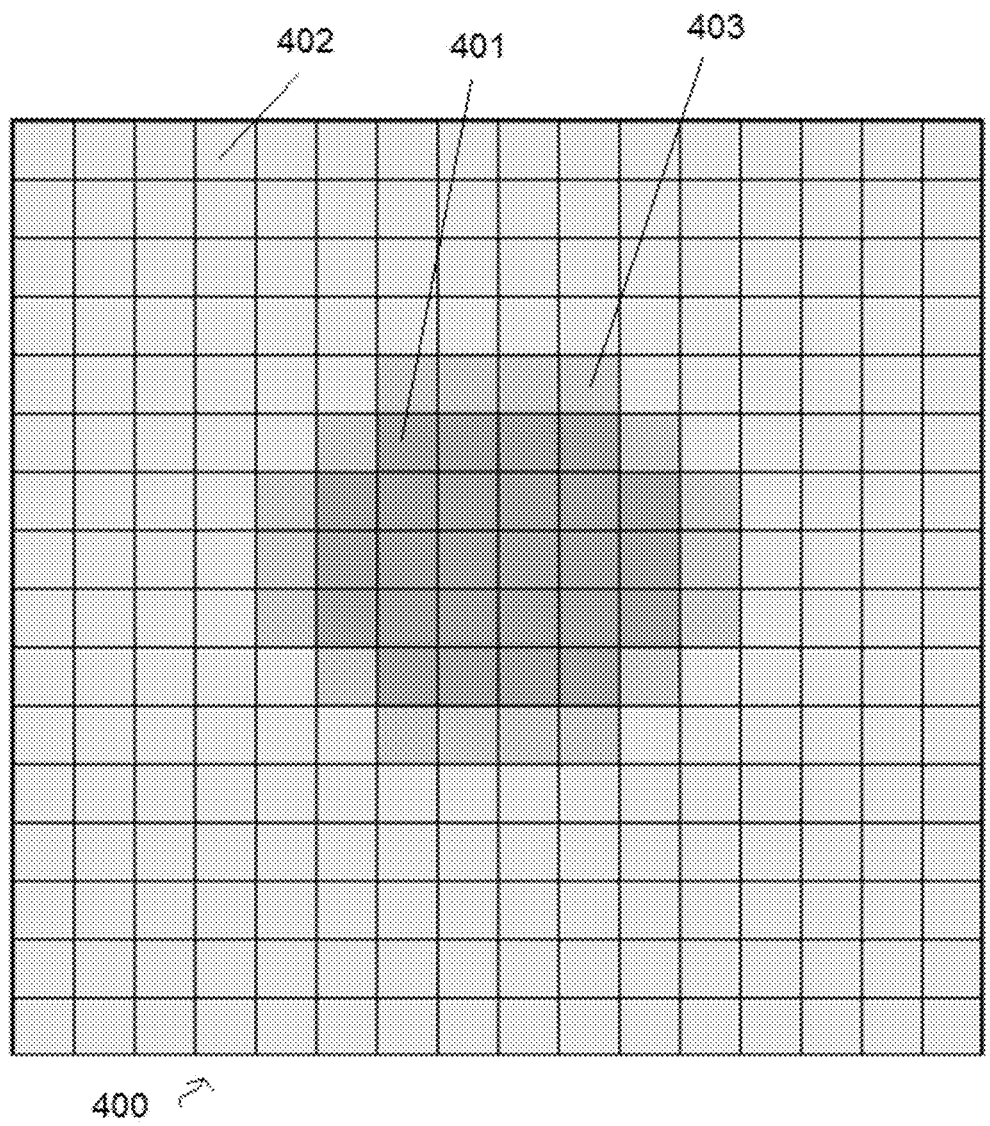
FIG. 4 shows an exemplary density texture that may be used in embodiments of the technology described herein.

FIG. 4 shows an exemplary density texture 400. In this Figure the darkest texture positions 401 show where higher resolution versions of the frame will be displayed, with the lightest texture positions 402 showing where the lowest resolution version of the frame will be displayed, and the "mid grey" texture positions 403 showing where a combination of the highest and lowest resolution regions of the frame should be displayed. In practice these density texture positions will each be represented by (will have stored for them) a suitable (grayscale) value, that will indicate which resolution version or versions of the frame to use for the output frame region that corresponds to the density texture position in question.

The data indicating the different resolution versions of the frame to use for respective output frame regions could also be provided in other forms, for example by means of a lookup table, or by some form of functional representation, or in the form of a bounding box (e.g. a 2D axis-aligned bounding box) that defines the area region(s) where the highest resolution version (level) should be used (with all other regions then being generated from a or the lower resolution (level) version of the frame).

Once the graphics processor 2 has generated and encoded the appropriate frame to be displayed, the display processor 5 will read that frame to be displayed from the memory 3, decode the frame, and provide an appropriate output frame or frames (e.g. one frame for each eye), for display.

The encoding selection may be per "superblock", or it could be for groups of superblocks (some combination of superblocks), such as 32×32 pixel blocks. It would also be possible to make an encoding selection within the resolution of a given superblock.

When lossy encoding is to be used (e.g. in lower resolution regions of the frame), the encoding can be made to be lossy in a number of different ways (and, e.g., the level of lossiness can be varied, if desired).

As described above, the encoding technique of various embodiments is a minimum tree delta encoding scheme. An encoded image is effectively a collection of superblocks' (16×16 or 32×8 pixels), each being described by a fixed-size header and a variable-size payload. Typically, each superblock consists of a set of 4×4 pixel sub-blocks that are each stored as 2-level 4-way trees, although the header can also encode a constant colour block with no payload.

The most extreme lossiness would be to encode a superblock as a constant colour. This would give a peak compression rate of 16 bytes/256 pixels=½ bit per pixel. It would also be possible to encode sub blocks within superblocks as a constant colour.

Less lossy techniques would be to truncate the tree early and/or to mark sub blocks within superblocks as being copies of each other.

Going on from this, the encoding can be configured to reduce the bitcount required to store the differences (deltas) in the difference tree. This may be done by reducing the size of the differences that need to be stored at a level in the tree.

In the most extreme such case, a parent node could be set to the average of the child nodes and the child nodes all set to zero. Thus, for example, while computing the minimum tree, the average of the data elements may instead be calculated, and all the children nodes may be set to zero, so reducing their bitcount to zero.

Figure 5:
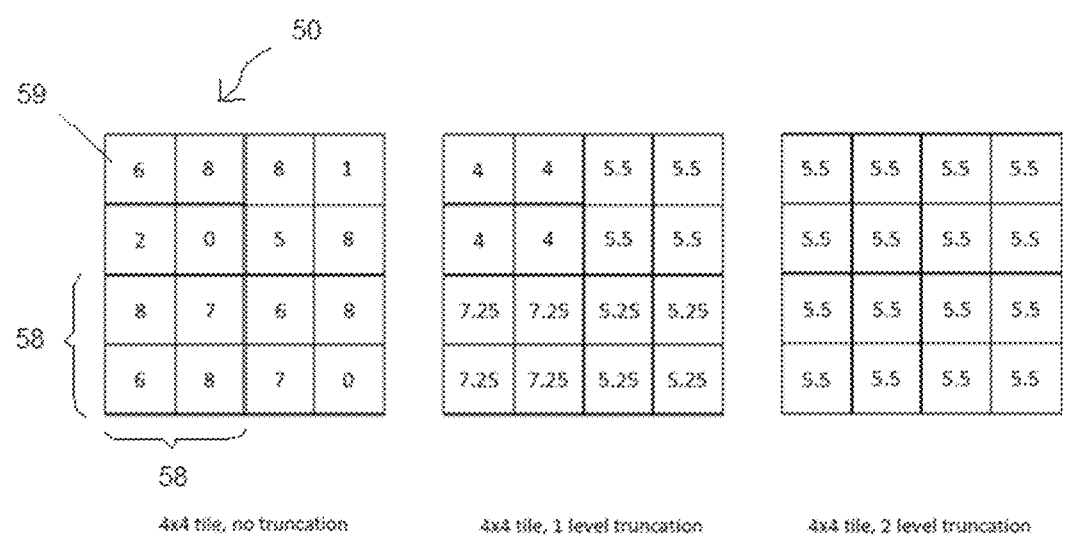
FIG. 5 shows schematically a process of truncating the values of a data array in accordance with embodiments of the technology described herein.

FIG. 5 shows examples of truncating a 4×4 block 40 of data elements 50. FIG. 5A shows the original, non-truncated, values of each of the individual data elements 59 of the 4×4 array of data elements 50. As shown in FIG. 5B, the data elements of each 2×2 sub-block 58 of the 4×4 array 50 may be averaged. Additionally or alternatively, as shown in FIG. 5C, the data elements of the entire 4×4 array 50 may be averaged.

These techniques can be done at any level within the difference tree, and it would be possible to only modify (e.g. set to zero) some but not all of the child nodes, thereby varying the degree of compression. Where groups of four data elements are averaged, the averaging can be done with the equivalent of a right shift rather than an integer divide.

Additionally or alternatively, a parent node could be set to a value that allows the differences to the child nodes to be reduced, so that smaller differences need to be encoded, thereby reducing the amount of encoding that needs to be done to encode the differences for the child nodes. It would be possible, for example, to halve the child node differences (rather than zeroing them) when doing the encoding. It would also be possible, for example, simply to reduce the value of the deltas rather than zeroing them to reduce the amount of encoding that is required to encode the differences.

Doing any of these steps would still produce a validly encoded image but with a smaller (or zero) payload size. The fact that the above encoding technique encodes superblocks separately means the decision of how much to encode/discard can be made per superblock and so the compression rate can vary across an image. As such, the above approaches provide a straightforward means of truncating data with a finite set of steps.

Figure 6:
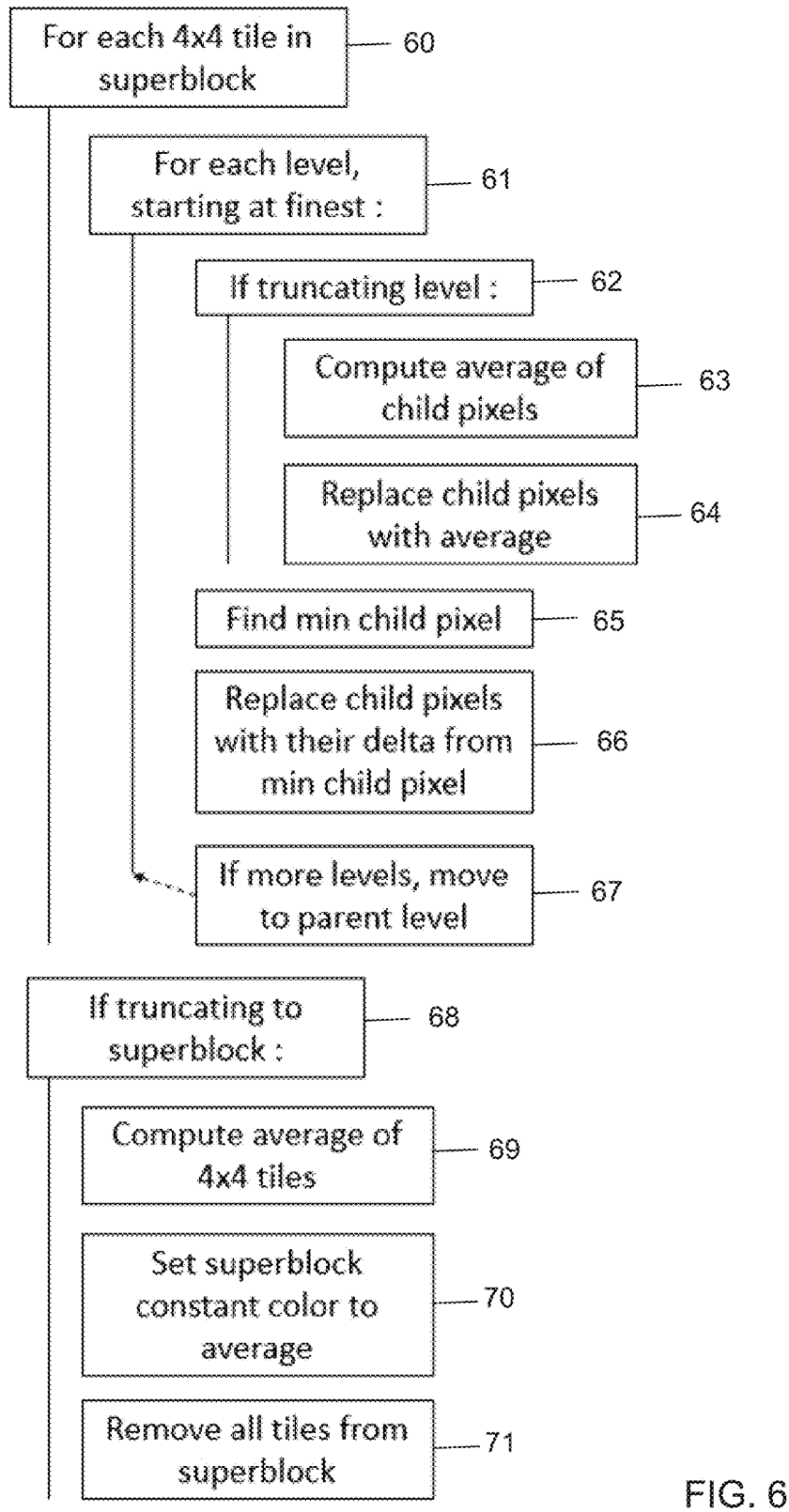
FIG. 6 shows schematically a decision process for truncating the values of a data array by averaging in accordance with embodiments of the technology described herein.

FIG. 6 shows show a decision process for truncating by averaging according to an embodiment. As shown in FIG. 6, the process 60 may be performed for each 4×4 block 40 of data elements in a data array. For each level in the tree representation 61, if truncation is to be performed at that level 62, the average of the child pixels is computed 63, and each of the child pixel values is replace by this average 64. The processing then continues as described above, to find the minimum child pixel value 65, and to replace each child pixel value with the difference value with respect to the minimum child pixel value 66. This process is performed from the bottom of the tree up, and so continues 67 with the parent level.

As also shown in FIG. 6, if truncation is to be performed for a superblock 68, the average of the values of the 4×4 tiles is computed 69, and the superblock is encoded as a constant colour 70, i.e. the average. In this case, all data relating to the sub-blocks within the superblock is removed 71, and not used to encode the superblock.

The above techniques preserve the average image intensity (up to decisions surrounding rounding), but would reduce frequency content of the image. In terms of appearance, this would be similar to truncating a haar wavelet expansion of a block, which may introduce blocky artefacts.

A further improvement, therefore, would be to apply a low pass filter before generating the minimum tree, so as to remove higher frequency components. This has the effect of producing a smoother result when decoding the lossily encoded data, e.g. by reducing the high frequencies and making the delta encoding increasingly efficient, but producing a smoother result.

One filtering arrangement would be to perform a frequency domain transformation (e.g. discrete cosine transform (DCT)) on the block or superblock values, truncate the high frequency components in the frequency domain, and then transform back to the spatial domain before doing the encoding. The DCT option may be useful in settings where the image data undergoes DCT for other reasons. Alternatively, direct spatial filtering could be used.

Figure 7:
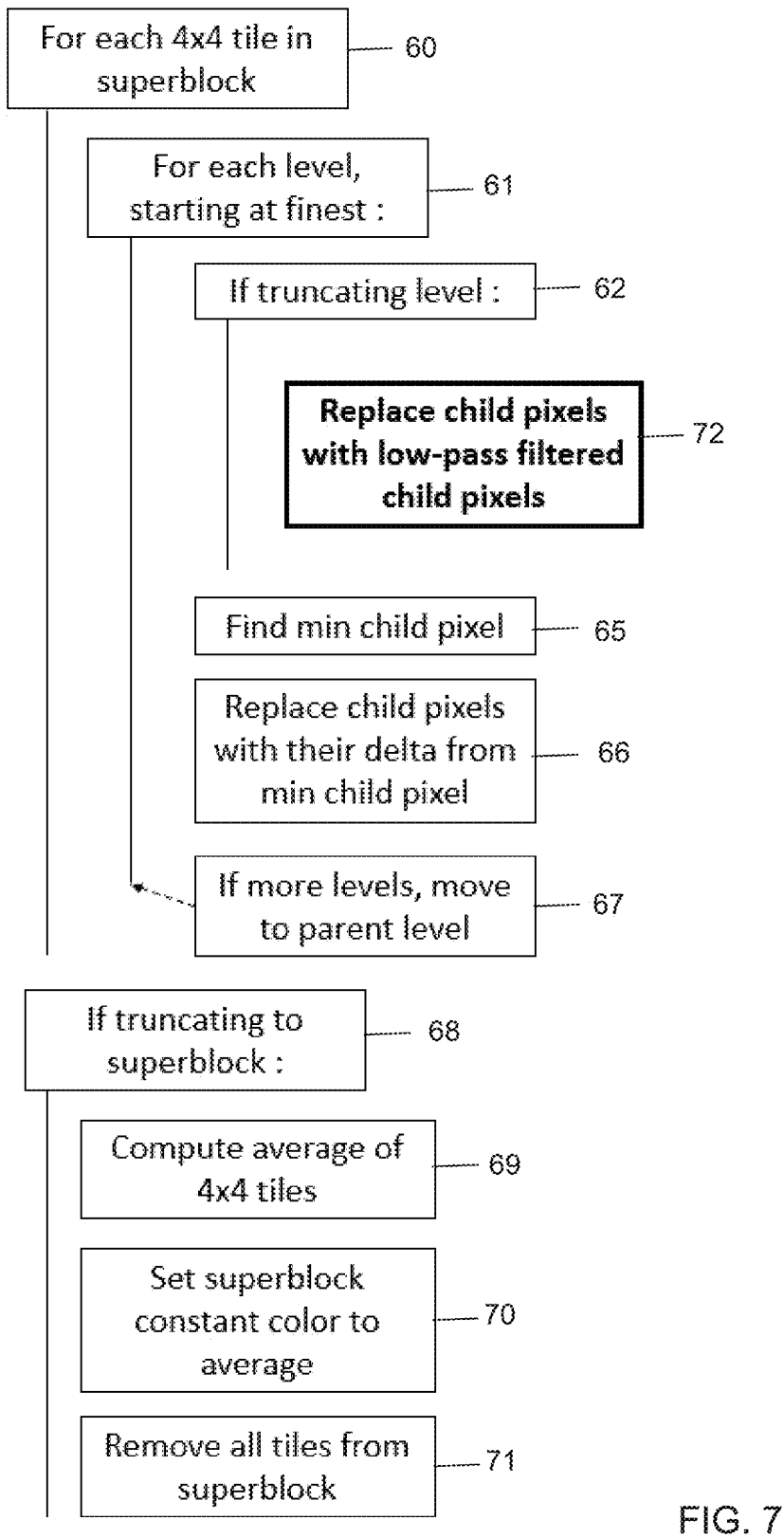
FIG. 7 shows schematically a decision process for truncating the values of a data array by filtering in accordance with embodiments of the technology described herein.

FIG. 7 shows show a corresponding decision process for truncating by filtering according to an embodiment. As shown in FIG. 7, this process is substantially similar to the process depicted in FIG. 6, except that if truncation is to be performed at a level 62, the child pixels are replaced with low-pass filtered child pixels 72 (as described above).

Other arrangement would be possible. For example, if the decoder is aware of the lossy compression scheme, it could use a more complex storage format in its line buffers, rather than just one data value for each pixel. For example, the display processor could store the decompressed data in a format similar to run-length encoding (RLE), as a line of the decompressed image will have portions where (1, 2, 4, 8, 16) pixels have the same value. If the decoder is aware of the exact function used by the encoder to choose how many levels to discard, this can be used by the display controller to use larger surfaces than would otherwise fit in its line buffer RAM. An advantage of this over a new lossy format is that the buffers are still compatible with decoders that are not aware that this buffer is in any way different.

These techniques can be used to enable a decoder that, e.g., has constraints in terms of the size of frames (images) that are conventionally (i.e. non-lossily) encoded it can handle (e.g. in terms of the payloads and headers or ratio of payloads to headers, etc., that it can handle) to, in effect, handle larger images (frames) by lossily encoding those larger frames to fit within the constraints of the decoder (in the case where displaying the final image not at the full resolution across the whole image is acceptable).

Although the present embodiment has been described above as generating a tree representation for a 16×16 block of data elements, other arrangements could be used. For example, a separate tree representation could be generated for each 8×8 data element block of the data array, or for each 16×4 data element block of the data array (i.e. such that the data array will be divided into 8×8 or 16×4 blocks, respectively).

Also, although the present embodiments have been described above with particular reference to the use of the techniques of the present embodiment with graphics processors and display controllers, the techniques of the technology described herein can be used for other data array processing and in particular for other image processing arrangements.

For example, the techniques of the technology described herein may be used in image signal processors and video decoders and encoders (MPEG/h.264, etc.). In these cases, the techniques of the technology described herein could be used, for example, to encode an image generated by an image signal processor which is processing data received from an image sensor to make a watchable image out of it. A video encoder/decoder could, for example, decode images (video frames) encoded in the form of the technology described herein to then compress the image using some other standard like h.264, and correspondingly encode frames of video data using the technique of the technology described herein for provision, for example, to a graphics processor or a display controller.

As can be seen from the above, the technology described herein, in some embodiments at least, provides a method and apparatus for encoding data arrays that can allow the encoded data to take less memory space (to be stored more efficiently), reduce the amount of memory traffic for reading the encoded data, and/or make more efficient the memory traffic for reading the encoded data. It can accordingly, thereby reduce power consumption.

This is achieved, in some embodiments at least by providing to the encoder data indicative of a resolution that is to be used by the consumer circuitry for at least one region of the array of data elements, and the encoder using the data indicative of the resolution that is to be used by the consumer circuitry to control the generation of the representation for representing at least one block that the array of data elements is divided into.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system, the data processing system comprising:
   producer circuitry operable to generate arrays of data elements;
   encoding circuitry operable to encode arrays of data elements;
   decoding circuitry operable to decode encoded versions of arrays of data elements; and
   consumer circuitry operable to use arrays of data elements;
   the method comprising:
   the producer circuitry generating an array of data elements;
   providing to the encoding circuitry the array of data elements;
   the encoding circuitry encoding the array of data elements so as to produce an encoded version of the array of data elements by: dividing the array of data elements into plural separate blocks, generating a respective representation for representing each different block that the array of data elements is divided into, and generating data representing each representation in an encoded form so as to represent the array of data elements as an encoded version of the array of data elements;
   the decoding circuitry decoding at least part of the encoded version of the array of data elements to produce a decoded version of the array of data elements; and
   the consumer circuitry using at least part of the decoded version of the array of data elements;
   wherein the method further comprises:
   providing to the encoding circuitry data indicative of a resolution that is to be used by the consumer circuitry for at least one region of the array of data elements; and
   wherein the encoding circuitry encoding the array of data elements further comprises:
   the encoding circuitry using the data indicative of the resolution that is to be used by the consumer circuitry to control the generation of the representation for representing at least one block that the array of data elements is divided into and the generation of the data representing the representation for representing the at least one block by:
      the encoding circuitry determining whether the data indicative of the resolution indicates that a relatively high resolution is to be used by the consumer circuitry for a region of the array of data elements that corresponds to the at least one block or whether the data indicative of the resolution indicates that a relatively low resolution is to be used by the consumer circuitry for a region of the array of data elements that corresponds to the at least one block; and
      when it is determined by the encoding circuitry that the data indicative of the resolution indicates that a relatively high resolution is to be used by the consumer circuitry for a region of the array of data elements that corresponds to the at least one block:
         the encoding circuitry selecting a higher fidelity representation for representing the at least one block, generating the higher fidelity representation for representing the at least one block, and generating data representing the higher fidelity representation in an encoded form; and
      when it is determined by the encoding circuitry that the data indicative of the resolution indicates that a relatively low resolution is to be used by the consumer circuitry for a region of the array of data elements that corresponds to the at least one block:
         the encoding circuitry selecting a lower fidelity representation for representing the at least one block, generating the lower fidelity representation for representing the at least one block, and generating data representing the lower fidelity representation in an encoded form.

2. The method of claim 1, wherein:
the consumer circuitry comprises a display controller operable to provide the decoded version of the array of data elements to a display for display; and
using the decoded version of the array of data elements comprises the display controller providing the decoded version of the array of data elements to the display for display.

3. The method of claim 1, wherein:
the consumer circuitry comprises a graphics processing unit; and
using the decoded version of the array of data elements comprises the graphics processing unit using the decoded version of the array of data elements when rendering an image for display.

4. The method of claim 1, wherein the higher fidelity representation is a lossless representation for representing the at least one block and the lower fidelity representation is a lossy representation for representing the at least one block; and
the encoding circuitry encoding the array of data elements comprises:
when it is determined by the encoding circuitry that the data indicative of the resolution indicates that a relatively high resolution is to be used by the consumer circuitry for a region of the array of data elements that corresponds to the at least one block:
the encoding circuitry selecting the lossless representation for representing the at least one block, generating the lossless representation for representing the at least one block, and generating data representing the lossless representation in an encoded form; and
when it is determined by the encoding circuitry that the data indicative of the resolution indicates that a relatively low resolution is to be used by the consumer circuitry for a region of the array of data elements that corresponds to the at least one block:
the encoding circuitry selecting the lossy representation for representing the at least one block, generating the lossy representation for representing the at least one block, and generating data representing the lossy representation in an encoded form.

5. The method of claim 1, wherein the higher fidelity representation is a higher fidelity tree representation for representing the at least one block, and the lower fidelity representation is a lower fidelity tree representation for representing the at least one block; and
the encoding circuitry encoding the array of data elements comprises:
when it is determined by the encoding circuitry that the data indicative of the resolution indicates that a relatively high resolution is to be used by the consumer circuitry for a region of the array of data elements that corresponds to the at least one block:
the encoding circuitry selecting the higher fidelity tree representation for representing the at least one block, generating the higher fidelity tree representation for representing the at least one block, and generating data representing the higher fidelity tree representation in an encoded form; and
when it is determined by the encoding circuitry that the data indicative of the resolution indicates that a relatively low resolution is to be used by the consumer circuitry for a region of the array of data elements that corresponds to the at least one block:
the encoding circuitry selecting the lower fidelity tree representation for representing the at least one block, generating the lower fidelity tree representation for representing the at least one block, and generating data representing the lower fidelity tree representation in an encoded form.

6. The method of claim 1, wherein the higher fidelity representation comprises a tree representation for representing the at least one block, and the lower fidelity representation comprises a truncated tree representation for representing the at least one block; and
the encoding circuitry encoding the array of data elements comprises:
when it is determined by the encoding circuitry that the data indicative of the resolution indicates that a relatively high resolution is to be used by the consumer circuitry for a region of the array of data elements that corresponds to the at least one block:
the encoding circuitry selecting the tree representation for representing the at least one block, generating the tree representation for representing the at least one block, and generating data representing the tree representation in an encoded form; and
when it is determined by the encoding circuitry that the data indicative of the resolution indicates that a relatively low resolution is to be used by the consumer circuitry for a region of the array of data elements that corresponds to the at least one block:
the encoding circuitry selecting the truncated tree representation for representing the at least one block, generating the truncated tree representation for representing the at least one block, and generating data representing the truncated tree representation in an encoded form.

7. The method of claim 1, wherein the lower fidelity representation comprises a tree representation for representing the at least one block, wherein the tree representation includes at least one indication associated with a node of the tree indicating that the node is a copy of another node.

8. The method of claim 1, wherein the lower fidelity representation comprises a tree representation for representing the at least one block, and wherein generating the tree representation comprises:
determining data values to be associated with each node of the tree representation by:
setting, in a first processing pass, each leaf node in the tree to the value that the tree is to indicate for the data element in the data array to be encoded that the leaf node represents, and each non-leaf node in the tree to the value of one of its child nodes;
in a second processing pass, subtracting from each node the value of its parent node; and then
reducing one or more of the resulting values so as to determine the data values to be associated with each node of the tree representation.

9. The method of claim 1, wherein the lower fidelity representation comprises a tree representation for representing the at least one block, and wherein generating the tree representation comprises setting one or more non-leaf nodes in the tree to the average value of its child nodes.

10. The method of claim 1, wherein the lower fidelity representation comprises a tree representation for representing the at least one block, and wherein generating the tree representation comprises filtering the array of data elements.

11. The method of claim 1, wherein the lower fidelity representation comprises a representation for representing the at least one block in which a single data value represents plural data elements of the at least one block.

12. A method of encoding an array of data elements using encoding circuitry of a data processing system, the method comprising:
  providing to the encoding circuitry the array of data elements;
  the encoding circuitry encoding the array of data elements so as to produce an encoded version of the array of data elements by: dividing the array of data elements into plural separate blocks, generating a respective representation for representing each different block that the array of data elements is divided into, and generating data representing each representation in an encoded form so as to represent the array of data elements as an encoded version of the array of data elements;
wherein the method further comprises:
  providing to the encoding circuitry data indicative of a resolution at which at least one region of the array of data elements is to be used; and
wherein the encoding circuitry encoding the array of data elements further comprises:
  the encoding circuitry using the data indicative of the resolution at which the at least one region of the array of data elements is to be used to control the generation of the representation for representing at least one block that the array of data elements is divided into and the generation of the data representing the representation for representing the at least one block by:
    the encoding circuitry determining whether the data indicative of the resolution indicates that a relatively high resolution is to be used for a region of the array of data elements that corresponds to the at least one block or whether the data indicative of the resolution indicates that a relatively low resolution is to be used for a region of the array of data elements that corresponds to the at least one block; and
    when it is determined by the encoding circuitry that the data indicative of the resolution indicates that a relatively high resolution is to be used for a region of the array of data elements that corresponds to the at least one block:
      the encoding circuitry selecting a higher fidelity representation for representing the at least one block, generating the higher fidelity representation for representing the at least one block, and generating data representing the higher fidelity representation in an encoded form; and
    when it is determined by the encoding circuitry that the data indicative of the resolution indicates that a relatively low resolution is to be used for a region of the array of data elements that corresponds to the at least one block:
      the encoding circuitry selecting a lower fidelity representation for representing the at least one block, generating the lower fidelity representation for representing the at least one block, and generating data representing the lower fidelity representation in an encoded form.

13. A data processing system comprising:
  producer circuitry operable to generate arrays of data elements;
  encoding circuitry operable to encode arrays of data elements;
  decoding circuitry operable to decode encoded versions of arrays of data elements; and
  consumer circuitry operable to use arrays of data elements;
wherein:
  the producer circuitry is configured to generate an array of data elements;
  the data processing system is configured to provide to the encoding circuitry the array of data elements;
  the encoding circuitry is configured to encode the array of data elements so as to produce an encoded version of the array of data elements by: dividing the array of data elements into plural separate blocks, generating a respective representation for representing each different block that the array of data elements is divided into, and generating data representing each representation in an encoded form so as to represent the array of data elements as an encoded version of the array of data elements;
  the decoding circuitry is configured to decode at least part of the encoded version of the array of data elements to produce a decoded version of the array of data elements; and
  the consumer circuitry is configured to use at least part of the decoded version of the array of data elements;
and wherein:
  the data processing system is configured to provide to the encoding circuitry data indicative of a resolution that is to be used by the consumer circuitry for at least one region of the array of data elements; and
  the encoding circuitry is configured to encode the array of data elements by using the data indicative of the resolution that is to be used by the consumer circuitry to control the generation of the representation for representing at least one block that the array of data elements is divided into and the generation of the data representing the representation for representing the at least one block by:
    the encoding circuitry determining whether the data indicative of the resolution indicates that a relatively high resolution is to be used by the consumer circuitry for a region of the array of data elements that corresponds to the at least one block or whether the data indicative of the resolution indicates that a relatively low resolution is to be used by the consumer circuitry for a region of the array of data elements that corresponds to the at least one block; and
    when it is determined by the encoding circuitry that the data indicative of the resolution indicates that a relatively high resolution is to be used by the consumer circuitry for a region of the array of data elements that corresponds to the at least one block:
      the encoding circuitry selecting a higher fidelity representation for representing the at least one block, generating the higher fidelity representation for representing the at least one block, and generating data representing the higher fidelity representation in an encoded form; and
    when it is determined by the encoding circuitry that the data indicative of the resolution indicates that a relatively low resolution is to be used by the consumer circuitry for a region of the array of data elements that corresponds to the at least one block:

the encoding circuitry selecting a lower fidelity representation for representing the at least one block, generating the lower fidelity representation for representing the at least one block, and generating data representing the lower fidelity representation in an encoded form.

14. The data processing system of claim 13, wherein the consumer circuitry comprises a display controller operable to provide the decoded version of the array of data elements to a display for display.

15. The data processing system of claim 13, wherein the consumer circuitry comprises a graphics processing unit.

16. The data processing system of claim 13, wherein the higher fidelity representation is a lossless representation for representing the at least one block and the lower fidelity representation is a lossy representation for representing the at least one block; and
the encoding circuitry is configured to encode the array of data elements by:
when it is determined by the encoding circuitry that the data indicative of the resolution indicates that a relatively high resolution is to be used by the consumer circuitry for a region of the array of data elements that corresponds to the at least one block:
the encoding circuitry selecting the lossless representation for representing the at least one block, generating the lossless representation for representing the at least one block, and generating data representing the lossless representation in an encoded form; and
when it is determined by the encoding circuitry that the data indicative of the resolution indicates that a relatively low resolution is to be used by the consumer circuitry for a region of the array of data elements that corresponds to the at least one block:
the encoding circuitry selecting the lossy representation for representing the at least one block, generating the lossy representation for representing the at least one block, and generating data representing the lossy representation in an encoded form.

17. The data processing system of claim 13, wherein the higher fidelity representation is a higher fidelity tree representation for representing the at least one block, and the lower fidelity representation is a lower fidelity tree representation for representing the at least one block; and
the encoding circuitry is configured to encode the array of data elements by:
when it is determined by the encoding circuitry that the data indicative of the resolution indicates that a relatively high resolution is to be used by the consumer circuitry for a region of the array of data elements that corresponds to the at least one block:
the encoding circuitry selecting the higher fidelity tree representation for representing the at least one block, generating the higher fidelity tree representation for representing the at least one block, and generating data representing the higher fidelity tree representation in an encoded form; and
when it is determined by the encoding circuitry that the data indicative of the resolution indicates that a relatively low resolution is to be used by the consumer circuitry for a region of the array of data elements that corresponds to the at least one block:
the encoding circuitry selecting the lower fidelity tree representation for representing the at least one block, generating the lower fidelity tree representation for representing the at least one block, and generating data representing the lower fidelity tree representation in an encoded form.

18. The data processing system of claims 13, wherein the higher fidelity representation comprises a tree representation for representing the at least one block, and the lower fidelity representation comprises a truncated tree representation for representing the at least one block; and
the encoding circuitry is configured to encode the array of data elements by:
when it is determined by the encoding circuitry that the data indicative of the resolution indicates that a relatively high resolution is to be used by the consumer circuitry for a region of the array of data elements that corresponds to the at least one block:
the encoding circuitry selecting the tree representation for representing the at least one block, generating the tree representation for representing the at least one block, and generating data representing the tree representation in an encoded form; and
when it is determined by the encoding circuitry that the data indicative of the resolution indicates that a relatively low resolution is to be used by the consumer circuitry for a region of the array of data elements that corresponds to the at least one block:
the encoding circuitry selecting the truncated tree representation for representing the at least one block, generating the truncated tree representation for representing the at least one block, and generating data representing the truncated tree representation in an encoded form.

19. The data processing system of claim 13, wherein the lower fidelity representation comprises a tree representation for representing the at least one block, wherein the tree representation includes at least one indication associated with a node of the tree indicating that the node is a copy of another node.

20. The data processing system of claim 13, wherein the lower fidelity representation comprises a tree representation for representing the at least one block, and wherein the encoding circuitry is configured to generate the tree representation by:
determining data values to be associated with each node of the tree representation by:
setting, in a first processing pass, each leaf node in the tree to the value that the tree is to indicate for the data element in the data array to be encoded that the leaf node represents, and each non-leaf node in the tree to the value of one of its child nodes;
in a second processing pass, subtracting from each node the value of its parent node; and then
reducing one or more of the resulting values so as to determine the data values to be associated with each node of the tree representation.

21. The data processing system of claim 13, wherein the lower fidelity representation comprises a tree representation for representing the at least one block, and wherein the encoding circuitry is configured to generate the tree representation by setting one or more non-leaf nodes in the tree to the average value of its child nodes.

22. The data processing system of claim 13, wherein the lower fidelity representation comprises a tree representation for representing the at least one block, and wherein the encoding circuitry is configured to generate the tree representation by filtering the array of data elements.

23. The data processing system of claim 13, wherein the lower fidelity representation comprises a representation for representing the at least one block in which a single data value represents plural data elements of the at least one block.

24. A data processing system comprising:
encoding circuitry configured encode an array of data elements so as to produce an encoded version of the array of data elements by: dividing the array of data elements into plural separate blocks, generating a respective representation for representing each different block that the array of data elements is divided into, and generating data representing each representation in an encoded form so as to represent the array of data elements as an encoded version of the array of data elements;
wherein the data processing system is configured to provide to the encoding circuitry the array of data elements and data indicative of a resolution at which at least one region of the array of data elements is to be used; and
the encoding circuitry is configured to encode the array of data elements by using the data indicative of the resolution at which at least one region of the array of data elements is to be used to control the generation of the representation for representing at least one block that the array of data elements is divided into and the generation of the data representing the representation for representing the at least one block by:
the encoding circuitry determining whether the data indicative of the resolution indicates that a relatively high resolution is to be used for a region of the array of data elements that corresponds to the at least one block or whether the data indicative of the resolution indicates that a relatively low resolution is to be used for a region of the array of data elements that corresponds to the at least one block; and
when it is determined by the encoding circuitry that the data indicative of the resolution indicates that a relatively high resolution is to be used for a region of the array of data elements that corresponds to the at least one block:
the encoding circuitry selecting a higher fidelity representation for representing the at least one block, generating the higher fidelity representation for representing the at least one block, and generating data representing the higher fidelity representation in an encoded form; and
when it is determined by the encoding circuitry that the data indicative of the resolution indicates that a relatively low resolution is to be used for a region of the array of data elements that corresponds to the at least one block:
the encoding circuitry selecting a lower fidelity representation for representing the at least one block, generating the lower fidelity representation for representing the at least one block, and generating data representing the lower fidelity representation in an encoded form.

25. A non-transitory computer readable storage medium storing computer software code which when executing on a processor performs a method of operating a data processing system, the data processing system comprising:
producer circuitry operable to generate arrays of data elements;
encoding circuitry operable to encode arrays of data elements;
decoding circuitry operable to decode encoded versions of arrays of data elements; and
consumer circuitry operable to use arrays of data elements;
the method comprising:
the producer circuitry generating an array of data elements;
providing to the encoding circuitry the array of data elements;
the encoding circuitry encoding the array of data elements so as to produce an encoded version of the array of data elements by:
dividing the array of data elements into plural separate blocks, generating a respective representation for representing each different block that the array of data elements is divided into, and generating data representing each representation in an encoded form so as to represent the array of data elements as an encoded version of the array of data elements;
the decoding circuitry decoding at least part of the encoded version of the array of data elements to produce a decoded version of the array of data elements; and
the consumer circuitry using at least part of the decoded version of the array of data elements;
wherein the method further comprises:
providing to the encoding circuitry data indicative of a resolution that is to be used by the consumer circuitry for at least one region of the array of data elements; and
wherein the encoding circuitry encoding the array of data elements further comprises:
the encoding circuitry using the data indicative of the resolution that is to be used by the consumer circuitry to control the generation of the representation for representing at least one block that the array of data elements is divided into and the generation of the data representing the representation for representing the at least one block by:
the encoding circuitry determining whether the data indicative of the resolution indicates that a relatively high resolution is to be used by the consumer circuitry for a region of the array of data elements that corresponds to the at least one block or whether the data indicative of the resolution indicates that a relatively low resolution is to be used by the consumer circuitry for a region of the array of data elements that corresponds to the at least one block; and
when it is determined by the encoding circuitry that the data indicative of the resolution indicates that a relatively high resolution is to be used by the consumer circuitry for a region of the array of data elements that corresponds to the at least one block:
the encoding circuitry selecting a higher fidelity representation for representing the at least one block, generating the higher fidelity representation for representing the at least one block, and generating data representing the higher fidelity representation in an encoded form; and
when it is determined by the encoding circuitry that the data indicative of the resolution indicates that a relatively low resolution is to be used by the consumer circuitry for a region of the array of data elements that corresponds to the at least one block:
the encoding circuitry selecting a lower fidelity representation for representing the at least one block, generating the lower fidelity representation for representing the at least one block, and generating data representing the lower fidelity representation in an encoded form.

\* \* \* \* \*